US009031703B2

(12) United States Patent
Nakamura et al.

(10) Patent No.: US 9,031,703 B2
(45) Date of Patent: May 12, 2015

(54) OPERATION MANAGEMENT APPARATUS, OPERATION MANAGEMENT METHOD, AND OPERATION MANAGEMENT PROGRAM

(75) Inventors: Takuji Nakamura, Tokyo (JP); Toshihiro Yamane, Kawasaki (JP); Eisuke Shimoda, Sakura (JP); Kimio Morino, Tokyo (JP)

(73) Assignee: Shimizu Corporation, Tokyo (JP)

( * ) Notice: Subject to any disclaimer, the term of this patent is extended or adjusted under 35 U.S.C. 154(b) by 951 days.

(21) Appl. No.: 13/045,949

(22) Filed: Mar. 11, 2011

(65) Prior Publication Data

US 2012/0083927 A1  Apr. 5, 2012

(30) Foreign Application Priority Data

Oct. 1, 2010  (JP) ................................. 2010-224127

(51) Int. Cl.
*G05B 13/00* (2006.01)
*G05B 13/02* (2006.01)
*F24F 11/00* (2006.01)

(52) U.S. Cl.
CPC .......... *G05B 13/026* (2013.01); *F24F 11/0009* (2013.01); *F24F 2011/0046* (2013.01); *F24F 2011/0058* (2013.01); *F24F 2011/0075* (2013.01)

(58) Field of Classification Search
CPC ............ H02J 3/14; H02J 3/18; G05B 13/048; G05B 13/042; G05B 17/02; G01R 21/133; G01R 22/00; G01R 19/2513; F24F 1/006; F24F 2011/0075
USPC ................ 700/276, 278; 165/208, 209; 236/1
See application file for complete search history.

(56) References Cited

U.S. PATENT DOCUMENTS 6,519,509 B1   2/2003  Nierlich et al.
2004/0111226 A1  6/2004  Brewster et al.
(Continued)

FOREIGN PATENT DOCUMENTS

CH   CN101630840   1/2010
JP   A-2005-221163   8/2005
(Continued)

OTHER PUBLICATIONS

Japanese Office Action issued in corresponding Japanese Patent Application No. 2010-224127 (Jun. 17, 2014).
(Continued)

*Primary Examiner* — Mohammad Ali
*Assistant Examiner* — Sheela S Rao
(74) *Attorney, Agent, or Firm* — Hoffmann & Baron, LLP

(57) ABSTRACT

An operation management apparatus includes an air conditioning thermal load prediction unit configured to calculate an air conditioning thermal load predicted value indicating a predicted amount of heat required to adjust temperature to a pre-set temperature on a day-of-prediction, a power generation output prediction processing unit configured to calculate power generation output prediction data indicating a generated power obtained by a generator within the day-of-prediction, and an operation planning unit configured to prepare an air conditioning heat source operation plan, and determines a purchased power and the generated power using the power generation output prediction data to thereby prepare a power facility operation plan indicating a schedule of a power output from the purchased power source and the generator, so that the purchased power per predetermined time supplied from a purchased power source of a commercial power system becomes a target value.

7 Claims, 18 Drawing Sheets

(56) References Cited

U.S. PATENT DOCUMENTS

2005/0143865 A1 6/2005 Gardner
2006/0276938 A1 12/2006 Miller

FOREIGN PATENT DOCUMENTS

| JP | 2006078009 | 3/2006 |
| JP | 2008011618 | 1/2008 |
| JP | A-2009-204221 | 9/2009 |
| JP | A-2009-247188 | 10/2009 |
| WO | WO9922284 | 5/1999 |

OTHER PUBLICATIONS

Japanese Office Action issued in corresponding Japanese Patent Application No. 2012-172343 (Jun. 17, 2014).

STEP 300
OPERATION PLANNING FOR HEAT SOURCE

STEP 400
PREDICTION OF POWER LOAD

STEP 500
OPERATION PLANNING FOR POWER SOURCE FACILITY

FIG. 17

| ACTUAL OPERATION DATA | COMPRESSOR + PRIMARY PUMP | SECONDARY PUMP | FAN/VALVE | FAN/VALVE | FAN/VALVE | FAN/VALVE | FAN/VALVE | ...... | TOTAL POWER | SINGLE DR EFFECT | CUMULATIVE DR EFFECT |
|---|---|---|---|---|---|---|---|---|---|---|---|
|  | 55kW | 5kW | 2kW × 20 UNITS = 40kW | | | | | | kW | kW | kW |
| 1 | 100% | 100% | 50Hz/O | 50Hz/O | 50Hz/O | 50Hz/O | 50Hz/O | ...... | 100.0 | 0.0 | 0.0 |
| 2 | 70%▼ | 100% | 50Hz/O | 50Hz/O | 50Hz/O | 50Hz/O | 50Hz/O | ...... | 83.5 | 16.5 | 16.5 |
| 3 | 0%▶ | 100% | 50Hz/O | 50Hz/O | 50Hz/O | 50Hz/O | 50Hz/O | ...... | 45.0 | 38.5 | 55.0 |
| 4 | 0% | (ABOUT 50% IN PROGRESS) | 50Hz/×▶ | 50Hz/×▶ | 50Hz/×▶ | 50Hz/×▶ | 50Hz/×▼ | PRESENCE OF ROTATION | 42.5 | 2.5 | 57.5 |
| 5 | 0% | 0% | 50Hz/×▶ | 50Hz/× | 50Hz/× | 50Hz/× | 50Hz/× | ...... | 20.0 | 22.5 | 80.0 |
|  | 0% | 0% | ×/×▶ | ×/×▶ | ×/×▶ | ×/× | ×/×▶ | ...... | 0.0 | 20.0 | 100.0 |

OPERATION MANAGEMENT APPARATUS, OPERATION MANAGEMENT METHOD, AND OPERATION MANAGEMENT PROGRAM

CROSS REFERENCE TO RELATED APPLICATIONS

This application claims priority on Japanese Patent Application No. 2010-224127, filed Oct. 1, 2010, the contents of which are incorporated herein by reference.

BACKGROUND OF THE INVENTION

1. Field of the Invention

The present invention relates to an operation management apparatus, an operation management method, and an operation management program, which may manages an operation plan with respect to a power supply device for supplying a power demand to a load device and the load device.

2. Description of Related Art

Purchased power provided by a power provider (hereinafter, referred to as power company) of a commercial power system is referred to as purchased power, and the purchased power supplied to a consumer household of the services having a load device such as a heat storage type air conditioning system, a lighting device, and the like is referred to as demand (power demand). It is necessary for the power company to prepare supply services corresponding to an average amount of power most widely used in a year by the services and the like of the consumer household of a supply target. Thus, in order to fairly charge for the services and the like of a plurality of consumer households, the power demand used in the services per measurement period (hereinafter, referred to as demand time unit), that is, a prescribed unit time is measured, and the contract demand is determined to correspond to maximum power demand among a plurality of the measured power demands. For example, an actual value of average power demand in a unit of 30 minutes, that is, the demand time unit in the services of the consumer household is measured to determine, as the maximum power demand (maximum demand) of a corresponding month, the maximum value among the actual values of the average power demands during the demand time unit for one month, so that a value that does not exceed the greater of either of the maximum demand of the corresponding month or maximum demand of the previous 11 months is determined as the contract demand. As an apparatus for carrying out the demand control, for example, the apparatus disclosed in JP-A-2008-11618 may be given.

In addition, recently, a smart grid system that combines a power system by a private-generator using solar power, wind power, and the like and a power system for purchasing power from the power company has attracted attention. In the smart grid, there is a requirement to suppress power fluctuation by smoothing the purchased power of the entire building, in addition to $CO_2$ emission, reduction in energy costs, reduction in the primary energy consumption, and the like. In the smart grid system, for example, an operation plan for defining a schedule of power consumption required for a load device and an operation plan for defining a schedule of output power from a power supply device is prepared in advance, and the shortage of power is covered by the purchased power while supplying the output power from the power supply device to the load device based on the operations plans. Thus, a system having the capability to automatically adjust the power demand in accordance with the operation plans is referred to as a smart grid.

In order to adjust the power demand of the building, there is a requirement to simultaneously adjust the load power (air conditioning heat source facility device, operation facility device, and the like) and the power output (generator or battery capable of adjusting outputs).

However, when adjusting the load power and the power output separately from each other, the fluctuation of power consumption of an air conditioning heat source apparatus, and the like may be heavier in comparison with operation facility device such as a lighting device, a computer, and the like, and the power consumption may be locally increased in accordance with the weather or a use environment of the room. Due to this, when the power demand is locally increased although the load device is operated according to the operation plan, an average value of the purchased power during the demand time unit may exceed the contract demand. Thus, there is a problem in that the demand control cannot be carried out so as to follow fluctuation of a power load of the load device having a large power load such as an air conditioning heat source device, and the like.

SUMMARY OF THE INVENTION

The invention is to solve the above problem, and an object of the invention is to provide an operation management apparatus, an operation management method, and an operation management program, which may execute a demand control following the fluctuation of a power load of a load device and power source device having a large power load, such as an air conditioning heat source facility device, and the like.

In order to solve the above problem, a first aspect of the invention provides an operation management apparatus, including: an air conditioning thermal load prediction unit configured to calculate an air conditioning thermal load predicted value indicating a predicted amount of heat required to adjust temperature to a pre-set temperature on a day-of-prediction; a power generation output prediction processing unit configured to calculate power generation output prediction data indicating a generated power obtained by a generator within the day-of-prediction; and an operation planning unit configured to prepare an air conditioning heat source operation plan indicating allocation for every hour of operation of each of the air conditioning heat source apparatuses generating the amount of heat indicated by the air conditioning thermal load predicted value, calculates a predicted power load indicating power supplied to a load device to generate the predicted amount of heat indicated by the air conditioning thermal load predicted value based on the air conditioning thermal load predicted value, and determines a purchased power corresponding to the power of the predicted power load and the generated power using the power generation output prediction data to thereby prepare a power facility operation plan indicating a schedule of a power output from the purchased power source and the generator, so that the purchased power per predetermined time frame (demand time unit) supplied from a purchased power source of a commercial power system becomes a target value.

The operation management apparatus may further include: a demand excess determination unit configured to determine whether the purchased power supplied from the purchased power source per the predetermined time frame (demand time unit) exceeds the target value; and a plan change unit configured to change the air conditioning heat source operation plan and the power facility operation plan to reduce the purchased power per the predetermined time frame (demand time unit) exceeding the target value when the purchased power is determined to exceed the target value by the demand excess determination unit, and to increase the purchased power per the predetermined time frame when the purchased power is determined not to exceed the target value.

The operation management apparatus may further include a real-time power demand control unit configured to control so as to reduce the purchased power per the predetermined time frame (demand time unit) when a predicted value of the purchased power predicted to be supplied from the purchased power source per the predetermined time frame (demand time unit) exceeds the target value based on actual measurement data obtained by measuring the purchased power supplied to the load device from the purchased power source, in a case where the demand excess determination unit determines whether the purchased power per the predetermined time frame (demand time unit) supplied from the purchased power source exceeds the target value based on the predicted power load in which the purchased power is changed by the plan change unit, and the purchased power is determined to exceed the target value.

A second aspect of the invention provides an operation management method, including: calculating an air conditioning thermal load predicted value indicating a predicted amount of heat required to adjust a temperature to a pre-set temperature on a day-of-prediction; calculating power generation output prediction data indicating a generated power obtained by a generator within the day-of-prediction; preparing an air conditioning heat source operation plan indicating allocation for every hour of operation of each of the air conditioning heat source apparatuses generating the amount of heat indicated by the air conditioning thermal load predicted value; and calculating a predicted power load indicating the power supplied to a load device to generate the predicted amount of heat indicated by the air conditioning thermal load predicted value based on the air conditioning thermal load predicted value, and determining a purchased power corresponding to a power of the predicted power load and the generated power using the power generation output prediction data to thereby prepare a power facility operation plan indicating a schedule of a power output from the purchased power source and the generator, so that the purchased power per the predetermined time frame (demand time unit) supplied from a purchased power source of a commercial power system becomes a target value.

A third aspect of the invention provides an operation management program for functioning a computer as a unit that calculates an air conditioning thermal load predicted value indicating a predicted amount of heat required to adjust temperature to a pre-set temperature on a day-of-prediction, a unit that calculates power generation output prediction data indicating a generated power obtained by a generator within the day-of-prediction, and a unit that prepares an air conditioning heat source operation plan indicating allocation for every hour of operation of each of the air conditioning heat source apparatuses generating the amount of heat indicated by the air conditioning thermal load predicted value, calculates a predicted power load indicating the power supplied to a load device to generate the predicted amount of heat indicated by the air conditioning thermal load predicted value based on the air conditioning thermal load predicted value, and determines the purchased power corresponding to a power of the predicted power load and the generated power using the power generation output prediction data to thereby prepare a power facility operation plan indicating a schedule of a power output from the purchased power source and the generator, so that the purchased power per predetermined time frame (demand time unit) supplied from a purchased power source of a commercial power system becomes a target value.

According to the above aspects of the invention, it is possible to execute a free demand control according to an operation plan following the fluctuation of a power load of a load device having a large power load, such as an air conditioning heat source apparatus, and the like.

BRIEF DESCRIPTION OF THE DRAWINGS

FIG. 17 is a diagram showing an example of a priority table according to a first embodiment of the present invention;

DETAILED DESCRIPTION OF THE INVENTION

First Embodiment

Hereinafter, an example of a smart grid system including a building energy management system 1 according to an embodiment of the present invention will be described in detail with reference to FIG. 1.

Figure 1:
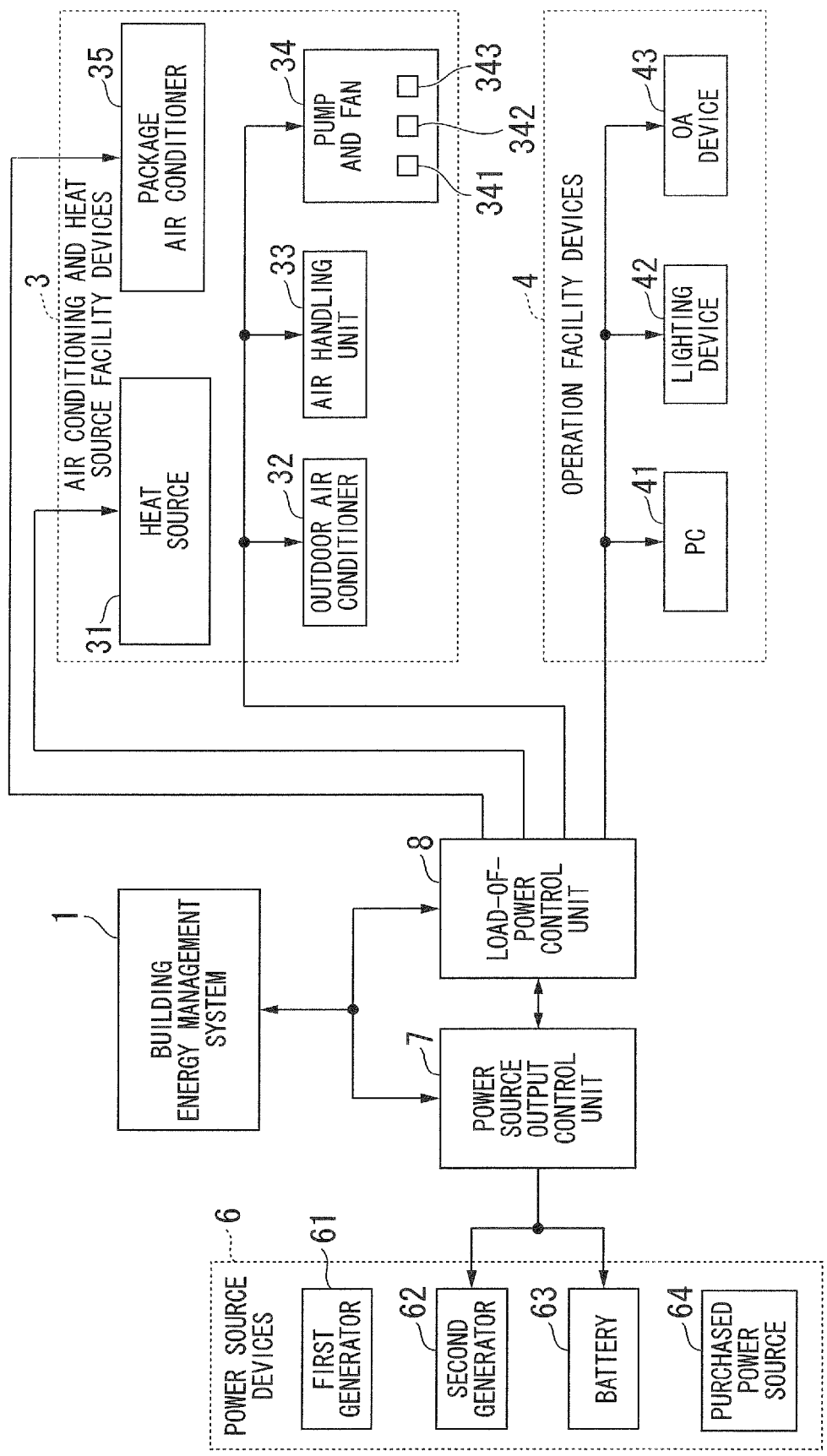
FIG. 1 is a block diagram showing an example of a configuration of a smart grid system according to a first embodiment of the present invention.

FIG. 1 is a block diagram showing an example of a configuration of a smart grid system according to a first embodiment of the present invention.

Referring to FIG. 1, the smart grid system includes the building energy management system 1, air conditioning heat source facility devices 3, operation facility devices 4, power source devices 6, a power source output control unit 7, and a load-of-power control unit 8.

The smart grid system includes the air conditioning heat source facility devices 3 and the operation facility devices 4 as a load device. Furthermore, fluctuation of a power consumption of the air conditioning heat source facility devices 3 is heavier in comparison with the operation facility devices 4 due to a heat source of the air conditioning heat source facility devices 3, and the power consumption is easily fluctuated depending on the weather or a use environment of the room.

The air conditioning heat source facility devices 3 includes a heat source 31, an outdoor air conditioner 32, an air handling unit 33, pump and fan 34, and a package air conditioner 35. The air conditioning heat source facility devices 3 is a facility device that adjusts, for example, a temperature of the room through the air handling unit 33 installed in respective rooms by adjusting a temperature of a circulated medium (for example, water) through the pump and fan 34. The air conditioning heat source facility devices 3 provides an amount of heat required by the load device to the outdoor air conditioner 32 or the air handling unit 33, using the pump and fan 34.

The pump and fan 34 are spread around each room, and includes a pipe 341 that is filled with a medium (liquid or gas) maintaining the amount of heat given by the heat source 31, a pump 342 that circulates the medium, and a water tank (heat storage tank) 343 that stores the medium maintaining the amount of heat.

The heat source 31 includes, for example, a heat pump, a gene link, or the like, and carries out a heating process of heating up the temperature of the medium filled in the pipe 341 and a cooling process of cooling down the temperature of the medium.

The outdoor air conditioner 32 adjusts a temperature of the outdoor air based on a temperature of the inside air by acquiring the outdoor air.

The air handling unit 33 adjusts the temperature of the outside air taken in by the outdoor air conditioner 32 in accordance with the inside temperature, using the temperature of the medium subjected to the heating process or the cooling process by the heat source 31.

The package air conditioner 35 adjusts the temperature of the outside air taken in by the outdoor air conditioner 32 in accordance with the inside temperature, without using the temperature of the medium subjected to the heating process or the cooling process by the heat source 31.

The operation facility devices 4 include a Personal Computer (PC) 41, a lightening device 42, and an Office Automation (OA) device 43. The PC 41, the lightening device 42, and the OA device 43 are operation facility device often installed in office buildings, etc, and are examples of the operation facility devices 4 according to the present embodiment.

In addition, the smart grid system includes a first generator 61, a second generator 62, a battery 63, and a purchased power source 64 as the power source devices 6 that supplies power to the load device.

The first generator 61 generates power by private-power generation using wind energy, solar energy, and the like. Since generated electrical energy of the first generator 1 is affected by weather conditions, the power output of the generated electrical energy is not constant.

The second generator 62 is a generator such as a gas engine generator, a gas turbine generator, or the like. Since the second generator 62 does not use the generated electrical energy affected by the weather conditions, the power output may be adjusted.

The battery 63 stores the generation power obtained by the first generator 61 and the second generator 62 and purchased power output from the purchased power source 64.

The purchased power source 64 outputs power (purchased power) that is purchased from a power company by a user.

In addition, with respect to the purchased power from the power company, since contract demand C [kW] corresponding to the user is determined, an additional charge such as a penalty is imposed on a paid charge determined according to the contract demand C in advance when a used average power per a predetermined time frame (demand time unit) exceeds the contract demand C. Here, the contract demand may be referred to as a demand target value C. Hereinafter, per the predetermined time frame corresponds to the demand time unit, and a certain time may be arbitrarily determined to be, for example, 30 minutes.

The building energy management system 1 manages an air conditioning heat source operation plan and a power facility operation plan.

The air conditioning heat source operation plan is a plan indicating an allocation for every hour obtained by allocating a thermal load required by the load device corresponding to the air conditioning heat source during the demand time unit. To supply a predicted amount of heat required to adjust temperature to a pre-set temperature on a day-of-prediction, the air conditioning heat source operation plan indicates a heat discharge amount that is consumed by the load device corresponding to the air conditioning heat source predicted in respective time periods of a day, and a heat storage amount stored in the thermal storage tank.

The power facility operation plan is a plan indicating an allocation for every hour of a power source (generation power and purchased power) supplied to all load devices. In the power facility operation plan, a predicted power load predicted to be supplied from the power source devices 6 is indicated by an operation schedule for each of the power outputs (first generator 61, second generator 62, battery 63, and purchased power source 64) included in the power source devices 6. For example, the power facility operation plan indicates power for operating the power source devices 6 per the predetermined time frame (demand time unit) in order to supply power to be predicted in the respective time periods of a day.

Also, further descriptions of the air conditioning heat source operation plan and the power facility operation plan will be made later.

To carry out an optimized operation control of the air conditioning heat source facility devices 3, the operation facility devices 4, and the power source devices 6, the building energy management system 1 acquires related information in advance, and executes an air conditioning thermal load prediction processing and a power generation output prediction processing based on the acquired information. In the air conditioning thermal load prediction processing, an amount of heat (air conditioning thermal load) predicted to be required for adjusting the temperature to the pre-set temperature is calculated. In the power generation output prediction processing, the power predetermined such that the first generator 61 is power-generated is calculated.

The building energy management system 1 carries out an operation plan preparation processing based on results of the air conditioning thermal load prediction processing and the power generation output prediction processing. An operation planning unit 105 prepares, based on these predicted results, the air conditioning heat source operation plan according to the predicted air conditioning thermal load, and at the same time, prepares the power facility operation plan indicating the power load of each power (first generator 61, second generator 62, battery 63, and purchased power source 64) of the power source devices 6 in which the purchased power from the purchased power source 64 is a target value (for example, a minimum value) according to the predicted air conditioning thermal load.

A basic processing of the building energy management system 1 is two processings. that is, the air conditioning thermal load prediction processing and the power generation output prediction processing which are carried out by acquiring various kinds of information, and the operation plan preparation processing of preparing the air conditioning heat source operation plan and the power facility operation plan based on the result.

The building energy management system 1 according to the present embodiment carries out a processing of executing a plan DR and a processing of executing a real-time DR in addition to the above-described two processings, as necessary.

Here, further descriptions thereof will be described later.

The power source output control unit 7 designates the power source (first generator 61, second generator 62, battery 63, and purchased power source 64) supplying power to the operation facility devices 4, to the power source devices 6, to the air conditioning heat source facility devices 3, that is, to the load device, based on the operation plan, to the operation DR processing, and to the real-time DR processing which are carried out by the building energy management system 1; and control the power output from the power source, and a timing thereof. Specifically, the power source output control unit 7 controls power output from the first generator 61, the second generator 62, and the battery 64 included in the power source devices 6. In addition, the power output from the purchased power source 64 is power insufficient in the power output from the first generator 61, the second generator 62, and the battery 63 with respect to demand of the load device (air conditioning heat source facility devices 3 and operation facility devices 4).

The load-of-power control unit 8 controls operations of the air conditioning heat source facility devices 3 and the operation facility devices 4, based on the operation plan, the plan DR processing, and the real-time DR processing which are carried out by the building energy management system 1.

Figure 2:
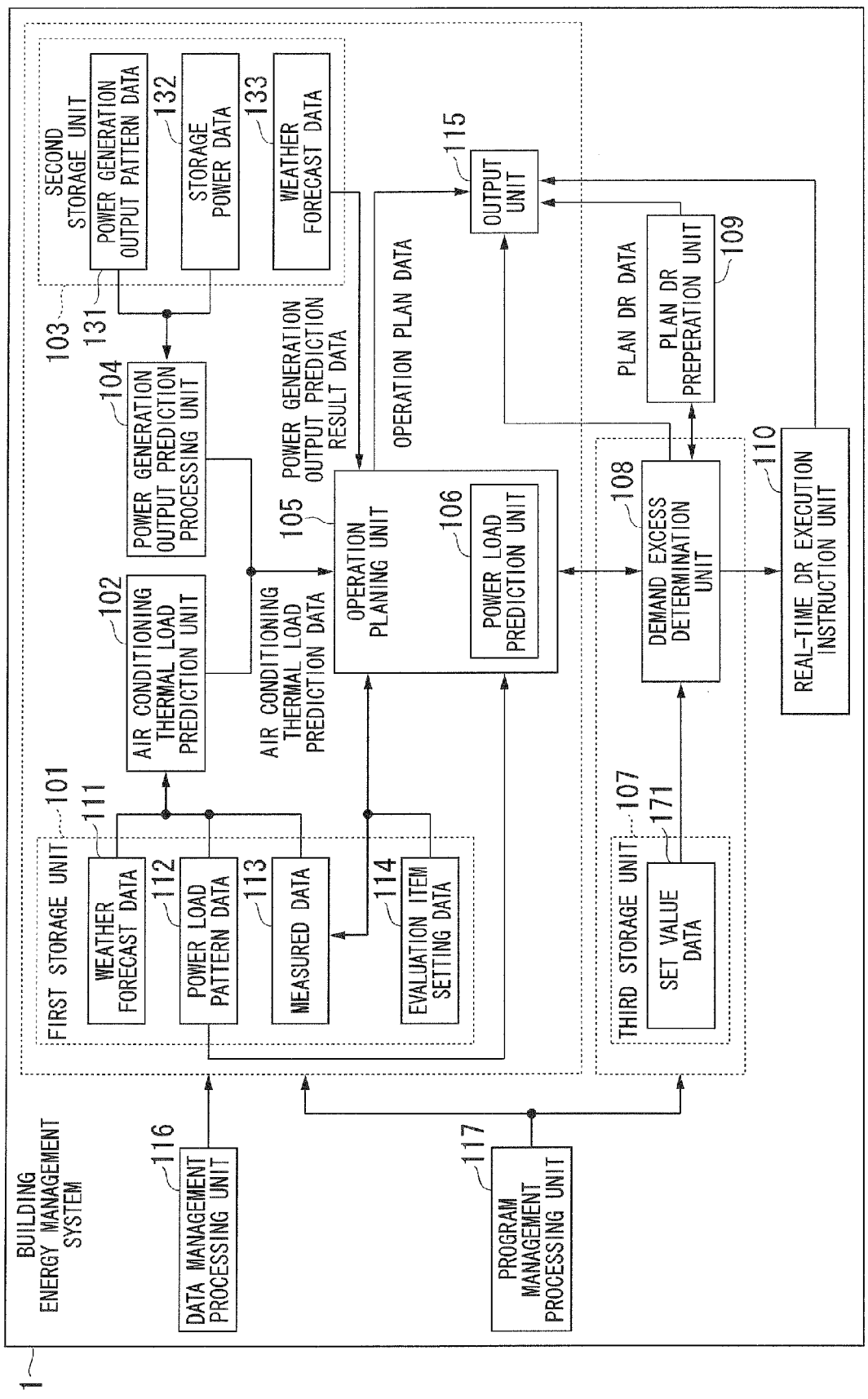
FIG. 2 is a block diagram showing an example of a configuration of an operation management apparatus according to a first embodiment of the present invention.

Hereinafter, an example of a configuration of the building energy management system 1 will be described in detail with reference to FIG. 2. FIG. 2 is a block diagram showing an example of a configuration of an building energy management system 1 according to a first embodiment of the present invention.

As shown in FIG. 2, the building energy management system 1 includes a first storage unit 101, an air conditioning thermal load prediction unit 102, a second storage unit 103, a power generation output prediction processing unit 104, an operation planning unit 105, a power load prediction unit 106, a third storage unit 107, a demand excess determination unit 108, a plan DR preparation unit 109, a real-time DR execution instruction unit 110, an output unit 115, a data management processing unit 116, and a program management processing unit 117.

The first storage unit 101 stores weather forecast data 111, power load pattern data 112, measured data 113, and evaluation item setting data 114.

The weather forecast data 111 is data in which weather forecast information indicating weather expected at a predetermined time of a day in accordance with a predetermined time frame (or time). As examples of the weather forecast information, weather, temperature, humidity, precipitation, sunshine duration, and the like are given.

The power load pattern data 112 includes information indicating a pattern of power consumption of the operation facility devices 4 corresponding to the time frame of the day. Specifically, power consumption of a time frame from 9:00 to 20:00 of a day during which people work is increased in comparison with a time frame from 00:00 to 05:00 during which people sleep. In addition, power consumption of non work days is reduced in comparison with weekdays. The power load pattern data 112 is obtained by patterning the difference in the power consumption by a number of the operation facility devices or a user.

In addition, the power load pattern data 112 includes information indicating a calculation pattern of the power consumption of the air conditioning heat source facility devices 3 corresponding to, for example, the time periods of a day. Specifically, a change in the room temperature of one day differs due to the number of people in the room, the number of air conditioners, the amount of sunshine, and the like, even though the air conditioners are installed in rooms of the same size. For example, since many people may be coming and going in a case of a daylong meeting, the room temperature changes throughout the day, and thereby a power load with respect to the air conditioning heat source facility devices 3 is increased. Meanwhile, when there are no meetings scheduled throughout the day, there is no need to keep the room temperature at a comfortable temperature. Also, the room temperature may be higher than a comfortable temperature in the summer, lower than a comfortable temperature in the winter, or the air conditioner may be stopped.

Since the power load with respect to the air conditioning heat source facility devices 3 is obtained through the calculation, the power load pattern data 112 is obtained by patterning an operation ratio or a temperature adjustment of a corresponding one day in accordance with the usage conditions of the room where the air handling unit 33 is installed.

The measured data 113 indicates a measured value of power consumption actually consumed by the load device of the operation facility devices 4 and the air conditioning heat source facility devices 3, and a measured value of power actually supplied from the power source devices 6. The measured value is measured by each device for each predetermined time interval to thereby correspond to a predetermined time frame of a day.

The evaluation item setting data 114 includes a reference value being an object of estimation such as energy saving, and the like. The air conditioning thermal load prediction unit 102 predicts an amount of heat required for adjusting a room temperature based on predicted weather forecast data and the power load pattern data 112. Specifically, the air conditioning thermal load prediction unit 102 calculates an air conditioning thermal load prediction value indicating an amount of heat (air conditioning thermal load) predicted to be required to adjust a temperature to a pre-set temperature. The air conditioning thermal load prediction value is the amount of heat, and is referred to as a load power exerted on the heat source 31 by being converted into power based on characteristics such as a temperature of outside air of the heat source 31, a partial load rate, and the like.

Figure 3:
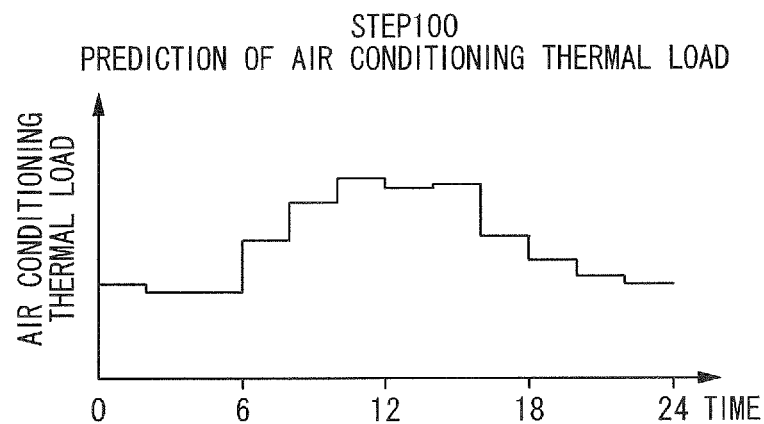
FIG. 3 is a diagram showing an example of an air conditioning thermal load predicted value according to a first embodiment of the present invention.

An example of the air conditioning thermal load prediction value is shown in FIG. 3. As shown in a graph of FIG. 3, in the air conditioning thermal load prediction value, a lateral axis indicates time, and a vertical axis indicates an air conditioning thermal load. As shown in FIG. 3, the air conditioning thermal load during the daytime is larger than the air conditioning thermal load during the night.

Referring again to FIG. 2, a processing of the air conditioning thermal load prediction unit 102 will be described in detail.

The air conditioning thermal load prediction processing unit 102 carries out operations (11) to (15) as described below.

(11) Processing of Acquiring Measured Data

The air conditioning thermal load prediction unit 102 acquires, from the power source output control unit 7 and the load power control unit 8, measured data by the power source devices 6, the air conditioning heat source facility devices 3, the operation facility devices 4 at a predetermined time interval, and stores the acquired measured data in the measured data 113 of the first storage unit 101.

(12) Processing of Acquiring Weather Forecast Data

The air conditioning thermal load prediction unit 102 connects to an internet server to store information such as weather forecasts or the like announced by the meteorological agency, and downloads the weather forecasts for each predetermined time. The air conditioning thermal load prediction unit 102 enables the downloaded weather forecasts to correspond to respective time periods of a day, and stores the corresponding information in the first storage unit 101 as the weather forecast data 111.

(13) Processing of Predicting ANN Load

The air conditioning thermal load prediction unit 102 produces prediction data based on the measured data and the weather forecast data, and carries out prediction on load data by starting an Artificial Neural Network (ANN) load prediction program using, for example, a neural network.

Specifically, the air conditioning thermal load prediction unit 102 reads, from the first storage unit 101, the weather forecast data 111, the power load pattern data 112, and the measured data 113, and calculates an amount of heat (air conditioning thermal load) predicted for regulating a temperature to the pre-set temperature, based on the read data.

By the air conditioning thermal load prediction unit 102, a produced air conditioning thermal load prediction value is written in the first storage unit 101.

In addition, with respect to the ANN load prediction processing, an existing technology (for example, see JP-A-2006-78009) may be used.

The air conditioning thermal load prediction unit 102 may predict the load data using technologies other than the neural network technology, without being limited to the above-described technology.

(14) Processing of Correcting Prediction

The air conditioning thermal load prediction unit 102 corrects the load data based on a difference between the actual load data on which an operation control is carried out by the ANN load prediction processing and the prediction data, and reflects the corrected data when preparing the next optimized operation plan.

Consequently, the air conditioning thermal load prediction unit 102 acquires, from the power output control unit 7 and the load power control unit 8, the measured data at a predetermined time interval, and reads, from the first storage unit 101, the air conditioning thermal load prediction value corresponding to a time when the operation control is executed. The air conditioning thermal load prediction unit 102 calculates the deviation between the measured data and the air conditioning thermal load prediction value to thereby produce a correction value corresponding to the deviation.

The second storage unit 103 stores power generation output pattern data 131, storage power data 132, and weather forecast data 133.

The power generation output pattern data 131 stores the minimum output value or the maximum output value of each power source (first generator 61, second generator 62, and purchased power source 64).

The storage power data 132 store information indicating the minimum storage amount of the battery 63 or the maximum storage amount of the battery 63.

The weather forecast data 133 is data obtained by enabling weather forecast information indicating weather predicted for a predetermined time of a day in accordance with a predetermined time frame (or time) having a certain time interval as described above. As examples of the weather forecast information, weather, temperature, humidity, precipitation, sunshine duration, and the like which are predicted in a corresponding time frame are given.

The power generation output prediction processing unit 104 calculates generated power supplied from a power source system by the power source devices 6 based on the weather forecast data indicating the predicted weather, and outputs power generation output prediction result data.

Figure 4:
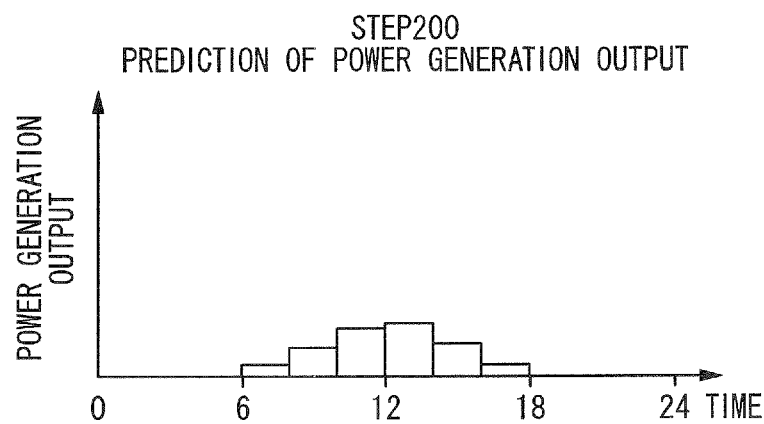
FIG. 4 is a diagram showing an example of power generation output prediction result data according to a first embodiment of the present invention.

An example of the power generation output prediction result data is shown in FIG. 4. As shown in a graph of FIG. 4, in the power generation output prediction result data, a lateral axis is time, and a vertical axis is output power from the generator 61. For example, the output power is obtained only during the daytime, and cannot be obtained at night.

Referring again to FIG. 2, the processing of the power generation output prediction processing unit 104 will be described in detail. The power generation output prediction processing unit 104 carries out operations (21) to (22) as shown below.

(21) Processing of Acquiring Weather Forecast Data

The power generation output prediction processing unit 104 acquires the weather forecast information in the same manner as that of the processing of acquiring the weather forecast by the air conditioning thermal load prediction unit 102, and stores the acquired information in the weather forecast data 133 of the first storage unit 101.

(22) Processing of Predicting Power Generation

The power generation output prediction processing unit 104 produces prediction data based on the weather forecast data, and starts a solar power generation prediction program using, for example, the power load pattern data 112 or a weather correction coefficient to thereby carry out prediction of output data. Consequently, the power generation output prediction processing unit 104 calculates power predicted to generate the first generator 61 depending on the weather based on the weather forecast data 111.

Description in Configuration of Carrying Out Operation Plan Preparation

The operation planning unit 105 prepares operation plan data indicating an operation plan (the operation plan throughout the specification including an air conditioning heat source operation plan and a power facility operation plan) of one day by a day prior to at least one day, based on the air conditioning thermal load prediction value, the power output prediction data, and information of the second storage unit. In addition, the operation planning unit 105 executes an exclusive program of carrying out optimization, and prepares an optimized air conditioning heat source operation plan and an optimized power facility operation plan as the operation plan.

Figure 5A:
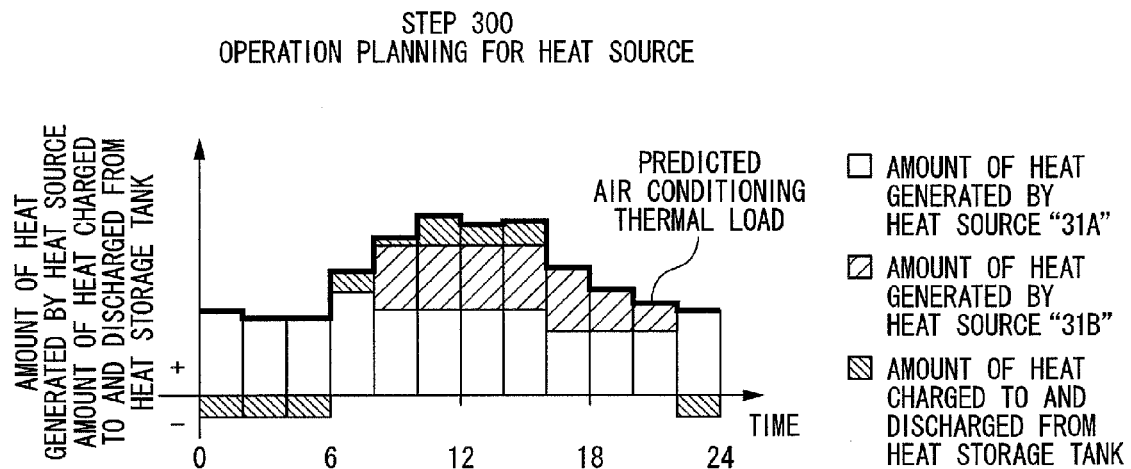
FIGS. 5A, 5B, and 5C are diagrams used for describing examples of a method of preparing an operation plan according to a first embodiment of the present invention.
Figure 5B:
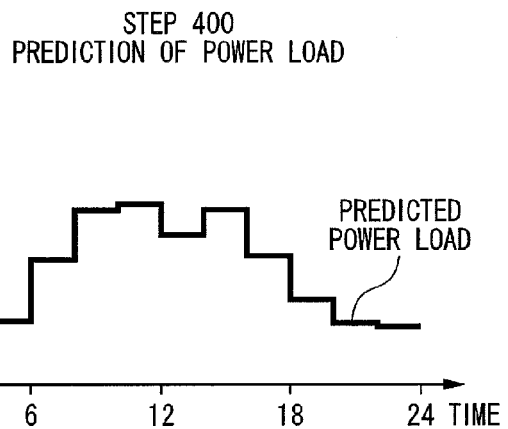
Figure 5C:
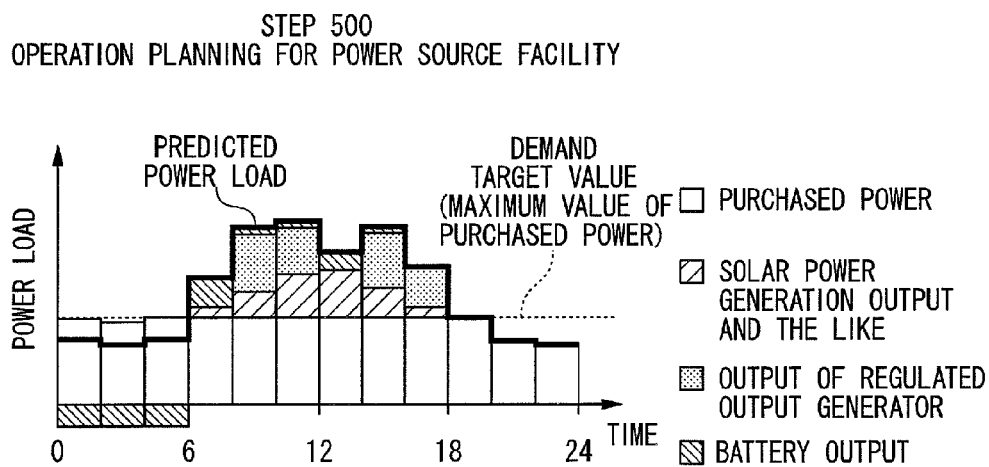

An example of preparing the operation plan by the operation planning unit 105 will be described in detail with reference to FIGS. 5A, 5B, and 5C. In addition, FIGS. 5A, 5B, and 5C are diagrams for conceptually describing the air conditioning heat source operation plan and the power facility operation plan prepared by the operation planning unit 105. The operation planning unit 105 according to the present embodiment carries out optimization so that a demand is minimized by, for example, a mathematical programming method which will be described later, and carries out the following processing. In addition, hereinafter, an example in which the heat source 31 includes a plurality of heat sources 31A and 31B will be described.

1) With Respect to Preparation of Air Conditioning Heat Source Operation Plan

The operation planning unit 105 carries out allocation of an amount of heat generated by the heat source 31 and the water tank 343 based on the air conditioning thermal load prediction value prepared by the air conditioning thermal load prediction unit 102 to thereby prepare the air conditioning heat source operation plan. Consequently, the operation planning unit 105 calculates the amount of heat generated by the heat source 31 and an amount of heat stored in the water tank 343 for each demand time unit in accordance with the air conditioning thermal load prediction value. The operation planning unit 105 prepares the air conditioning heat source operation plan indicating allocation for each time (for each time indicated by the demand time unit) with respect to operations of each air conditioning heat source facility device producing the calculated amount of heat and an amount of stored heat (that is, an amount of heat indicated by the air conditioning thermal load prediction value). This is shown in a graph of FIG. 5A.

In the graph of FIG. 5A, a lateral axis indicates time, and a vertical axis indicates an amount of heat generated or stored by the heat source 31 or the water tank 343. In this graph, a positive value of the vertical axis denotes discharge of heat, and a negative value thereof denotes storage of heat. As shown in the graph, the operation planning unit 105 prepares the air conditioning heat source operation plan for each demand time unit so that a sum (that is, an amount of heat generated or discharged by heat source 31 and the water tank 343) of an amount of generated heat generated by the air conditioning thermal source apparatus 31 and an amount of discharged heat is equalized with the air conditioning thermal load prediction value obtained in step ST100.

In the graph of FIG. 5A, during a time frame from 0:00 to 6:00, the heat source 31A generates an amount of heat, and the amount of heat is stored in the water tank 343. In addition, during a time frame from 6:00 to 8:00, the heat source 31A generates heat, and the water tank 343 discharges heat. In addition, during a time frame from 8:00 to 16:00, the heat sources 31A and 31B generate heat, and the water tank 343 discharges heat. In addition, during a time frame from 16:00 to 22:00, the heat sources 31A and 31B generate heat. Furthermore, during a time frame from 22:00 to 24:00, the heat source 31A generates an amount of heat, and the amount of heat is stored in the water tank 343.

2) With Respect to Calculation of a Predicted Power Load Corresponding to an Air Conditioning Thermal Load Prediction Value The operation planning unit 105 calculates power consumption required to generate an amount of heat indicated by the heat source 31 for each of the calculated demand time unit, based on the power load pattern data 112. The operation planning unit 105 calculates power (power load) required for all load devices of the air conditioning heat source facility devices 3 and the operation facility devices 4 based on the power load pattern data, in addition to the power consumption of the heat source 31. That is, the operation planning unit 105 calculates power consumption required for another load device which is predicted as the power consumption required for supplying the thermal load indicated by the air conditioning thermal load prediction value. In this manner, the power consumption of the load device calculated by the operation planning unit 105 based on the air conditioning thermal load prediction value is power indicated by the generated power supplied to a demand (purchased power supplied to a consumer household) and the consumer household, and hereinafter referred to as a predicted power load. An example of the predicted power load is shown in a graph of FIG. 5B. In the graph of FIG. 5B, a lateral axis indicates time, and a vertical axis indicates a power load.

In addition, according to the present embodiment, the operation planning unit 105 prepares the power facility operation plan so that the demand is a target value. Hereinafter, for convenience of description, when describing the predicted power load, a predicted value corresponding only to the demand excluding the generated power supplied to the consumer household out of the power demand, will be described.

3) With Respect to Preparation of Power Facility Operation Plan

The operation planning unit 105 carries out allocation of power based on the calculated predicted power load of the air conditioning heat source facility devices 3 and the operation facility devices 4, so that the demand becomes the target value (for example, a minimum value). The power facility operation plan is to indicate the allocation of the power for each demand time unit.

For example, when the predicted power load is lower than a demand target value, that is, contract demand C, the operation planning unit 105 increases the purchased power to the predicted power load or more, and determines the purchased power as the power facility operation plan in which the purchased power is stored in the battery 63. In addition, when the predicted power load is more than the demand target value C, the operation planning unit 105 reduces the maximum of the purchased power down to the demand target value C or less, and at the same time, prepares the power facility operation plan so that the shortage of the power is covered by power from the first generator 61 and the second generator 62 and power from the battery 63.

As shown in FIG. 5C, during a time frame from 0:00 to 6:00, the predicted power load is lower than the demand target value C. Due to this, the operation planning unit 105 increases the purchased power up to the predicted power load or more, and prepares the power facility operation plan to store the purchased power in the battery 62. Meanwhile, during a time frame from 6:00 to 18:00, the predicted power load exceeds the demand target value C. Due to this, the operation planning unit 105 reduces the maximum of the purchased power down to the demand target value C, and carries out allocation of power for each demand time unit, so that the power load more than the demand target value C is covered by power from the first generator 61 and the second generator 62 and power of the battery 63. The operation planning unit 105 prepares the power facility operation plan based on the shortage of the power determined as the output prediction of the first generator 61 indicated by the power generation output prediction result data predicted by the power generation output prediction processing unit 104 by combining the purchased power stored in the battery 63 during a time frame from 0:00 to 6:00 and the power from the second generator 62.

Specifically, the operation planning unit 105 prepares the power facility operation plan using the mathematical programming method based on an evaluation function, a variable, and a constraint condition which will be described later.

Evaluation Function: $\max(p_{P_{nt}}) + PE$ [Equation 1]

Variables: $Pg_{nt}^{ng}, Pb_{nt}^{nb}, Qh_{nt}^{nh}, Qhs_{nt}^{nhs}$

0/1 Variables: $\delta g_{nt}^{ng}, \delta b_{nt}^{nb}, \delta h_{nt}^{nh}$

Constraint Conditions:
$$\sum_{m=1}^{ng\_max} Pg_{nt}^m + \sum_{m=1}^{nb\_max} Pb_{nt}^m + P_{P_{nt}} = Pl_{nt}(Qh_{nt}^{nh}, Qhs_{nt}^{nhs})$$

$$\sum_{m=1}^{nh\_max} Qh_{nt}^m + \sum_{m=1}^{nhs\_max} Qhs_{nt}^m = Ql_{nt}$$

$$\delta g_{nt}^{ng} \times Pg\_min^{ng} \leq Pg_{nt}^{ng} \leq \delta g_{nt}^{ng} \times Pg\_max^{ng}$$

$$\delta b_{nt}^{nb} \times Pb\_min^{nb} \leq Pb_{nt}^{nb} \leq \delta b_{nt}^{nb} \times Pb\_max^{nb}$$

$$\delta h_{nt}^{nh} \times Qh\_min^{nh} \leq Qh_{nt}^{nh} \leq \delta h_{nt}^{nh} \times Qh\_max^{nh}$$

$$Zb_{nt+1}^{nb} = Zb_{nt}^{nb} - Pb_{nt}^{nb}$$

$$Zhs_{nt+1}^{nhs} = Zhs_{nt}^{nhs} - Phs_{nt}^{nhs}$$

$$Zb\_min^{nb} \leq Zb_{nt}^{nb} \leq Zb\_max^{nb}$$

$$Zhs\_min^{nhs} \leq Zhs_{nt}^{nhs} \leq Zhs\_max^{nhs}$$

$$PE = \alpha \times \sum_{m=2}^{nt\_max} (|\delta g_{m-1}^{ng} - \delta g_m^{ng}| + |\delta b_{m-1}^{nb} - \delta b_m^{nb}| + |\delta h_{m-1}^{nh} - \delta h_m^{nh}|)$$

The abbreviations shown in the formula is as follows.

nt{nt=1, 2, ... } denotes information indicating a time frame in a schedule for one day using sequence of the demand time units. Note that, when the demand time unit is 30 minutes, the maximum value of nt is represented as (nt_max)=24 [hour]/demand time unit (0.5) [hour]=48.

ng{ng=1, 2, ... } denotes the number of the first generators 61 and the second generators 62.

nb{nb=1, 2, ... } denotes the number of the batteries 63.

nh{nh=1, 2, ... } denotes the number of the heat sources 31.

nhs{nhs=1, 2, ... } denotes the number of the thermal storage tanks 343.

Pg denotes output power from the first generator 61 and the second generator 62.

Pb denotes output power from the battery 63, and the discharge is represented as a positive value.

Qh denotes an air conditioning heat source generating heat, i.e., an amount of heat generated by the heat source 31.

Qhs denotes a thermal storage tank discharge heat, i.e., an amount if heat discharged from the water tank 343.

Δg denotes a start or stop state of the generator indicating whether the first generator 61 and the second generator 62 start or stop.

Δb denotes a start or stop state of the battery 63 indicating whether the battery 63 stops or starts.

Δh denotes a start or stoppage state of the air conditioning heat source indicating whether the heat source 31 starts or stops.

Pp denotes purchased power output from the purchased power source 64.

Pl denotes a predicted value of the electrical power load.

Ql denotes a predicted value of the air conditioning thermal load.

Pg_min denotes a generator minimum output, i.e., the minimum value of the output power from the first generator 61 and the second generator 62.

Pg_max denotes a generator maximum output, i.e., the maximum value of the output power from the first generator 61 and the second generator 62.

Pb_min denotes a battery minimum output, i.e., the minimum value of storage power from the battery 63.

Pb_max denotes a battery maximum output, i.e., the maximum value of storage power from the battery 63.

Qh_min denotes an air conditioning heat source minimum amount of heat indicating the minimum of the amount of heat generated by the heat source 31.

Qh_max denotes an air conditioning heat source maximum amount of heat indicating the maximum of the amount of heat generated by the heat source 31.

Zb denotes a battery remaining storage quantity indicating a remaining amount of the storage power stored by the battery 63.

Zhs denotes a thermal storage tank remaining amount of heat indicating a remaining amount of heat stored by the water tank 343.

Zb_min denotes a battery minimum storage amount indicating the minimum value of storage power stored by the battery 63.

Zb_max denotes a battery maximum storage amount indicating the maximum value of the storage power stored by the battery 63.

Zhs_min denotes a thermal storage tank minimum storage amount indicating the minimum value of a thermal storage amount stored by the water tank 343.

Zhs_max denotes a thermal storage tank maximum storage amount indicating the maximum value of a thermal storage amount stored by the water tank 343.

PE denotes a penalty.

α denotes a penalty coefficient.

In addition, the operation planning unit 105 determines the power facility operation plan of one day in which the generator, the battery, and the heat source are optimized by the mathematical programming method. In this case, the operation planning unit 105 enables operations such as energy saving, cost saving, $CO_2$ emission reduction, and the like by performing the energy saving, the cost saving, the $CO_2$ emission reduction, and the like as an optimum purpose when the demand is reduced. In addition, when the maximum demand prediction value predicted by performing the energy saving, the cost saving, and the like exceeds the demand target value, the operation planning unit 105 determines the power facility operation plan of one day of the generator, the battery, and the heat source in which the demand becomes the minimum, by applying the optimum purpose to the mathematical programming method as a minimizing of the demand.

Description with Respect to Configuration of Carrying Out Plan DR

The power load prediction unit 106 detects the maximum value (hereinafter, referred to as demand peak value) of the average value of power demand for each demand time unit by inputting operation plan data from the operation planning unit 105. Specifically, the air conditioning heat source operation plan is prepared by the operation planning unit 105, and the power facility operation plan indicating allocation of power as shown in FIG. 5C is prepared based on the predicted power load indicated in FIG. 5B. Here, the power facility operation plan prepared by the operation planning unit 105 is obtained by optimizing the demand as the minimum value, and allocation of the purchased power is not optimized as being less than the demand target value C. Here, with reference to FIG. 6, a rate of the power demand indicating, as the amount of electric power, the demand of the purchased power source 64 in the power facility operation plan prepared by the operation planning unit 105 will be described.

Figure 6:
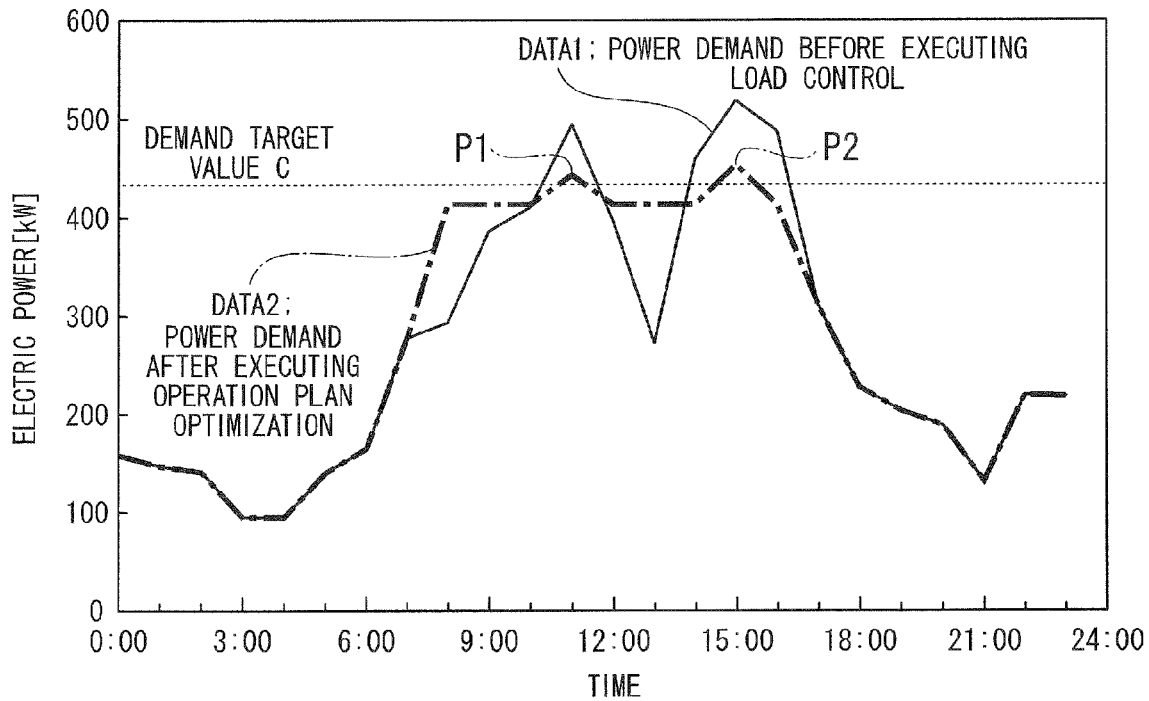
FIG. 6 is a diagram used for describing an example of a predicted power load required for processing an operation plan optimization according to a first embodiment of the present invention.

In FIG. 6, when two demand peak values, that is, the maximum value of the power demand exist, and two demand peak values exceed the demand target value C, an example of the power facility operation plan with respect to the demand is shown.

In the graph of FIG. 6, the power demand, in which a lateral axis denotes time and a vertical axis denotes the power demand, is shown.

In FIG. 6, data 1 indicating the power demand before carrying out the operation plan optimization and data 2 indicating the power demand after carrying out the operation plan optimization are shown. In addition, the data 1 is a comparative example regardless of the present embodiment, the operation planning unit 105 according to the present embodiment calculates the power demand shown in the data 2.

As shown in FIG. 6, the power demand of the data 2 shows the demand peak value from 11:00 to 15:00, so that a demand peak value P1 from 10:30 to 11:30 and 14:30 to 15:30 exceeds the demand target value C. In addition, a demand peak value P1 at 11:00 is less than a demand peak value P2 at 15:00.

The power load prediction unit 106 detects the demand peak value of the power demand, and detects, as a demand maximum value, the maximum demand peak value among the detected demand peak values. In FIG. 6, the power load prediction unit 106 detects the peak value P2 as the demand maximum value. In addition, as for the demand maximum value, the maximum value among actual values of the power demand for one month is determined as the demand maximum value for one month by measuring the actual values of the power demand in the services of the consumer household.

In addition, the power demand represented in the data 2 is generally increased at work time. This is because the amount of the power consumption by the operation facility devices 4 is changed to be relatively flat (even), whereas the amount of the power consumption by the power source device such as the air conditioning heat source apparatus 13 and the like is greatly changed in accordance with a change in weather conditions. The demand peak value of the data 2 is reduced in comparison with that of the data 1.

The power load prediction unit 106 detects the power demand of which a peak is at 11:00 and 15:00 when indicating the power demand in the data 2 after carrying out the operation plan optimization based on the operation plan data, and outputs the detected power demand in the demand excess determination unit 108. In addition, when a plurality of the power demand corresponding to the demand peak value exceeding the detected demand target value is detected, the power load prediction unit 106 may output the detected power demand in the demand excess determination unit 108 in descending order of the value of the power demand.

The third storage unit 107 stores set value data 171.

The set value data 171 is information indicating the demand target value C, for example, the contract demand C.

The demand excess determination unit 108 inputs the power demand of the demand peak value and operation plan data from the power load prediction unit 106, and determines whether a peak value (maximum value) of an average of the demands corresponding to the demand time unit indicated in the power facility operation plan exceeds the demand target value, that is, the contract demand C.

When at least one demand peak value is determined to exceed the demand target value C, the demand excess determination unit 108 outputs, ton the plan DR preparation unit 109, a control signal for controlling the plan DR preparation unit 109 to prepare the plan DR.

Meanwhile, when all demand peak values are determined not to exceed the demand target value C, the demand excess determination unit 108 outputs, in the output unit 115, the operation plan data prepared by the operation planning unit 105, together with a determination result indicating that the demand peak value does not exceed the demand target value C.

In addition, when the plan DR prepared by the plan DR preparation unit 109 is input, the demand excess determination unit 108 determines whether a peak value of an average value of demands corresponding to demand time unit, supplied from the purchased power source 64 being a commercial power source system among DR power load prediction values per demand time unit in the plan DR, exceeds the demand target value C.

When at least one of the demand peak value is determined to exceed the demand target value C, the demand excess determination unit 108 outputs, to the real-time DR execution instruction unit 110, a real-time DR execution instruction signal for instructing the real-time DR execution instruction unit 110 to execute a real-time DR.

Meanwhile, when the peak value of the average value of the demands corresponding to all of the demand time units is determined not to exceed the demand target value C, the demand excess determination unit 108 outputs, to the output unit 115, the operation plan data prepared by the operation planning unit 105 and the plan DR prepared by the plan DR preparation unit 109 together with a determination result indicating that the demand peak value does not exceed the demand target value C.

When at least one demand peak value exceeds the demand target value C by the demand excess determination unit 108, the plan DR preparation unit 109 prepares a plan DR indicating the operation plan changing the predicted power load during the demand time unit in which the demand peak value exceeds the demand target value C in the power facility operation plan.

For example, the plan DR preparation unit 109 calculates a DR power load prediction value obtained by reducing the predicted power load for each demand time unit in which the power demand exceeds the demand target value C, by an amount in which the power demand exceeds the demand target value C. The plan DR preparation unit 109 prepares the plan DR by carrying out allocation of the power load of the air conditioning heat source facility devices 3 or the operation facility devices 4 based on the calculated DR power load prediction value. In addition, the demand changed by the plan DR preparation unit 109 is referred to as a demand predicted value.

For example, as shown in FIG. 6, in the data 2 after carrying out the operation plan optimization, the demand time unit (n) in which the power demand exceeds the demand target value C corresponds to 30 minutes (n=21) from 10:30, 30 minutes (n=22) from 11:00, 30 minutes (n=29) from 14:30, and 30 minutes (n=30) from 15:00.

The plan DR preparation unit 109 prepares the plan DR to instruct to stop or start an operation of the outdoor air conditioner 32 and the lightening device 42 of the air conditioning heat source facility devices 3 or the operation facility devices 4 only during the demand time unit (for example, n=21, 22, 29, 30) in which the power demand exceeds the demand target value C.

Figure 7:
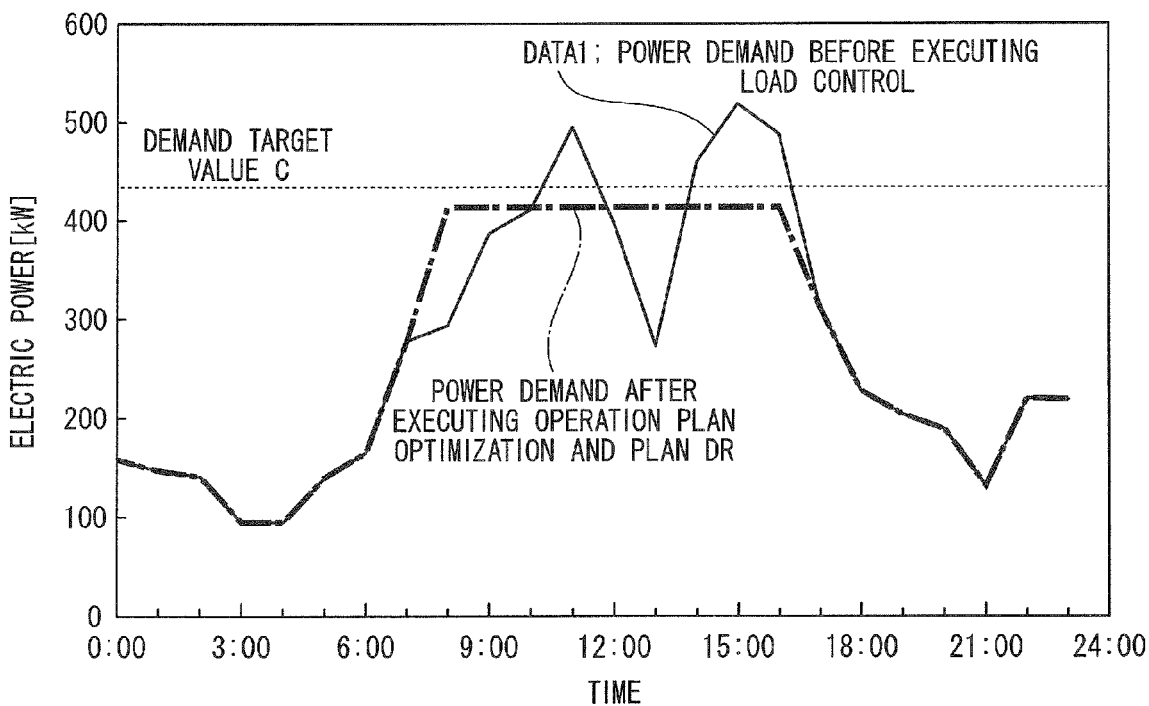
FIG. 7 is a diagram used for describing an example of a predicted power load required for processing an operation plan and a plan Demand Response (DR) processing according to a first embodiment of the present invention.

The plan DR preparation unit 109 changes the operation plan so that the demand peak value is equal to or less than the demand target value C as shown in FIG. 7. In addition, a major purpose of the outdoor air conditioner 32 is to perform room ventilation, and there is no big problem even when the outdoor air conditioner 32 stops for a while after performing sufficient ventilation.

Description with Respect to Configuration of Carrying Out Real-Time DR

When at least one demand peak value is determined to exceed the demand target value C by the demand excess determination unit 108, the real-time DR execution instruction unit 110 controls the power source output control unit 7 and the load-of-power control unit 8 based on the operation plan data and the plan DR data other than a time period in which the demand peak value is determined not to exceed the demand target value C.

The real-time DR execution instruction unit 110 carries out the real-time DR processing in the time period in which the demand peak value is predicted to exceed the demand target value C. The real-time DR execution instruction unit 110 outputs, to the output unit 115, an instruction signal indicating to instruct the load power control unit 8 to control power demand corresponding to a measured value of the amount of power supplied to the air conditioning heat source facility devices 3 and the operation facility devices 4.

Figure 8:
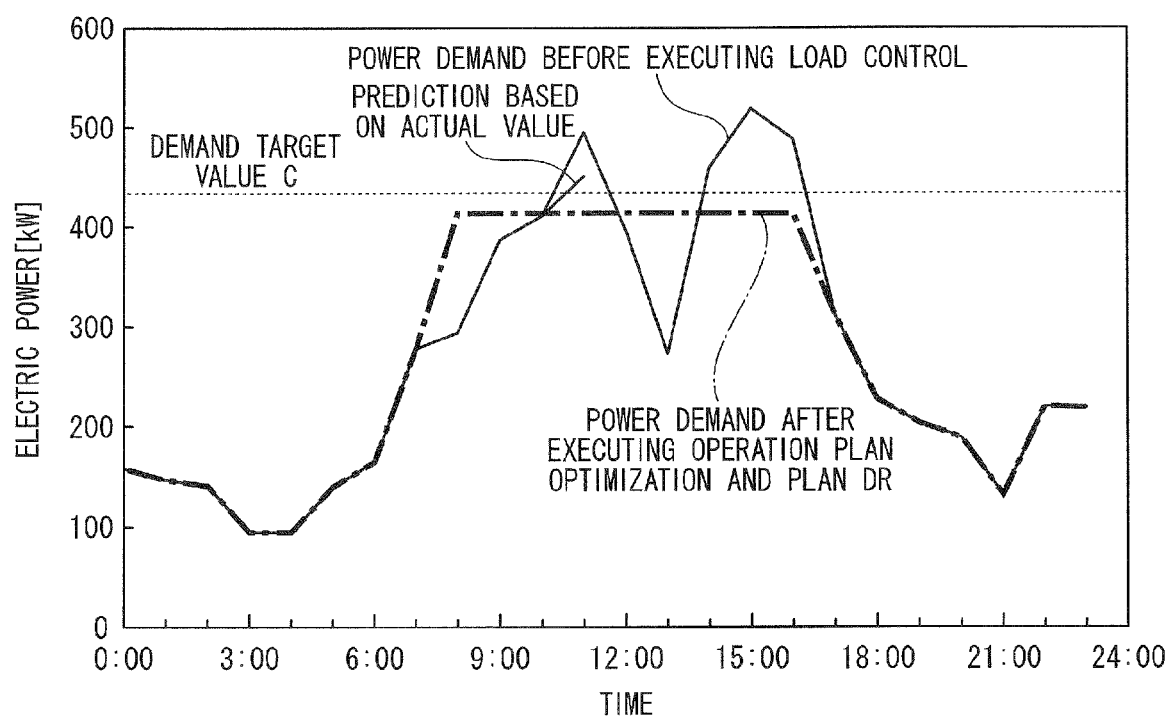
FIG. 8 is a diagram used for describing an example of a real-time DR processing according to a first embodiment of the present invention.

Referring to FIG. 8, when the power demand is not suppressed to be equal to or less than the demand target value C even by the plan DR preparation unit 109, there is a risk in the real-time DR execution instruction unit 110 that the measured value exceeds the demand target value C as shown in FIG. 8.

When a corresponding demand is predicted by the demand time unit, and the predicted demand is determined to exceed the demand target value C, the real-time DR execution instruction unit 110 carries out the real-time DR processing. In addition, further description of the real-time DR processing will be described in detail later.

The output unit 115 outputs the input operation plan preparation data (information indicating air conditioning heat source operation plan and power facility operation plan) to the power source output control unit 7 and the load-of-power control unit 8.

The output unit 115 outputs a plan DR data and a real-time DR execution instruction signal to the load power control unit 8.

The data management processing unit 116 carries out management of various kinds of acquired data. The data management processing unit 116 carries out functions of referring to or downloading the measured data, weather forecast data, prediction load data, operation management data, and the like, a function of correcting pattern data, a function of correcting schedule data, and a function of setting a parameter such as the contract demand or the optimized evaluation axis.

The program management processing unit 117 carries out a schedule management for controlling at what timing an optimized operation in which each processing for preparing the optimized operation plan is to start. The schedule management carries out a control of the program at the start time based on processing schedule data for a day.

Hereinafter, with reference to FIG. 9, an example of an operation plan management method according to a first embodiment of the present invention will be described in detail.

Figure 9:
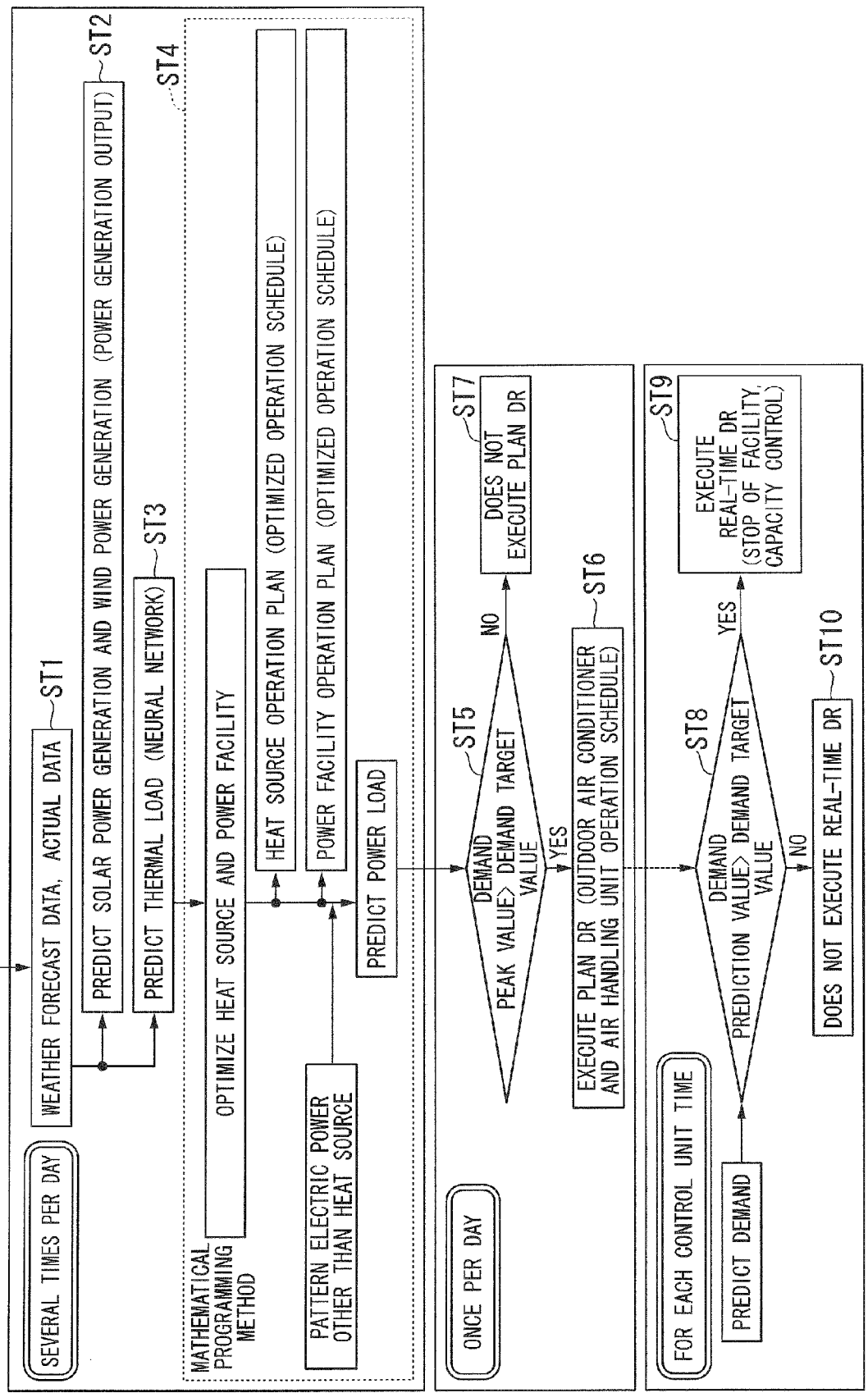
FIG. 9 is a flowchart used for describing an example of an operation plan management method according to a first embodiment of the present invention.

FIG. 9 is a flowchart used for describing the example of the operation plan management method according to a first embodiment of the present invention.

As shown in FIG. 9, the air conditioning thermal load prediction unit 102 acquires the measured data and the weather forecast data. In addition, in step ST1, the power generation output prediction processing unit 104 acquires the weather forecast data.

Next, in step ST2, the power generation output prediction processing unit 104 carries out a power generation output prediction processing. That is, in step ST2, the power generation output prediction processing unit 104 calculates power generation output prediction result data indicating power predicted to generate the generator 61 depending on the weather, based on the power generation output pattern data 131, the storage power data 132, and the weather forecast data 133.

Next, in step ST3, the air conditioning thermal load prediction processing unit 102 carries out an air conditioning thermal load prediction processing. That is, the air conditioning thermal load prediction processing unit 102 calculates an air conditioning thermal load prediction value indicating an amount of heat (air conditioning thermal load) predicted to be required to adjust a temperature to a pre-set temperature. Since the weather forecast data is used, the air conditioning thermal load prediction is carried out several times for one day at the timing when the weather forecast is updated.

Next, in step ST4, the operation planning unit 105 carries out an operation plan preparation processing. That is, the operation planning unit 105 calculates the amount of heat generated by the heat source 31 and the amount of heat stored by the water tank 343 for each demand time unit, and prepares the air conditioning heat source operation plan corresponding to the air conditioning thermal load prediction value.

In addition, the operation planning unit 105 calculates the predicted power load required when generating the amount of heat indicated by the air conditioning thermal load prediction value of the heat source 31, based on the calculated air conditioning heat source operation plan.

The operation planning unit 105 carries out allocation of power so that the demand becomes a target value (for example, a minimum value) based on the predicted power load. Specifically, the operation planning unit 105 calculates an optimized operation schedule of the power facility operation plan. In addition, the operation planning unit 105 calculates even the power load of the load device other than thermal load when calculating the predicted power load. Since the power consumption of the lightening device and OA device other than the air conditioning heat source is changed in the same manner every day, patterns may be found in the power consumption.

Due to this, the operation planning unit 105 carries out an optimization of the power load of the air conditioning heat source facility devices 3 and the operation facility devices 4 based on the air conditioning thermal load indicated by the air conditioning thermal load prediction value.

The power load prediction unit 106 detects the demand peak value for each demand time unit based on the operation plan data indicating the operation plan prepared by the operation planning unit 105, and outputs the detected demand peak value to the demand excess determination unit 108.

In step ST5, the demand excess determination unit 108 determines whether the demand peak value input from the power load prediction unit 106 is larger than the demand target value C, that is, the contract demand.

When the demand peak value is larger than the demand target value C (demand peak value>demand target value C), the plan DR preparation unit 109 prepares the plan DR in step ST6. Meanwhile, when the demand peak value is less than or equal to the demand target value C (demand peak value≤demand target value C), the plan DR preparation unit 109 does not prepare the plan DR in step ST7. That is, the demand excess determination unit 108 outputs, to the power source output control unit 7 and the load-of-power control unit 8 through the output unit 115, the operation plan data (air conditioning heat source operation plan and power facility operation plan) prepared by the operation planning unit 105.

Next, the demand excess determination unit 108 compares the demand prediction value with the demand target value C which is changed in the plan DR, based on the plan DR prepared by the plan DR preparation unit 109. In step ST8, the demand excess determination unit 108 determines whether the demand prediction value is larger than the demand target value C.

When the demand prediction value is larger than the demand target value C (demand prediction value>demand target value C), the real-time DR execution instruction unit 110 carries out the real-time DR in step ST9. Meanwhile, when the demand prediction value is less than or equal to the demand target value C (demand prediction value≤demand target value C), the real-time DR execution instruction unit 110 does not execute the real time DR in step ST10. That is, the demand excess determination unit 108 outputs the operation plan data prepared by the operation planning unit 105 and the plan DR prepared by the plan DR preparation unit 109 to the power source output control unit 7 and the load-of-power control unit 8 through the output unit 115.

The operation planning unit 105 calculates the power load prediction value by converting the air conditioning thermal load to the power load, while preparing the air conditioning heat source operation plan based on the air conditioning thermal load prediction value, and prepares the power facility operation plan indicating allocation of power corresponding to the power load prediction value. Thus, since it is possible to match the air conditioning heat source operation plan and the power facility operation plan, the power source device such as the generator, the battery, and the like and the air conditioning heat source facility device such as an air conditioner and the like are cooperatively controlled, thereby realizing a demand control of controlling the demand to a target value.

In addition, when the demand exceeds the demand target value by the operation plan processing carried out by the operation planning unit 105, the building energy management system 1 prepares the plan DR by the plan DR preparation unit 109 to thereby calculate the demand prediction value.

Due to this, the demand peak value exceeds the demand target value, thereby preventing the demand from exceeding the contract demand C. Thus, a problem does not occur such that an additional charge such as a penalty is imposed on a paid charge determined to correspond to the contract demand C in advance when the average power used during the demand time unit exceeds the contract demand C. As a result, economical effects may be obtained.

In addition, the following can be performed using the present embodiment.

For example, in an operation plan processing of the operation planning unit 105, a cost optimization is carried out based on an hourly rate system employed by Japanese power companies by changing an energy unit cost for each time, a peak time adjustment contract, or an hourly rate system employed by U.S. power companies.

In addition, using the real-time DR processing, when a request for adjusting load is made by the power company to the consumer due to variation in natural energy assumed in a smart grid in the future, it is possible for the consumer to immediately respond to such a request.

Example of Plan DR Preparation Processing by Plan DR Preparation Unit 109

Hereinafter, an example of the plan DR preparation processing carried out by the plan DR preparation unit 109 will be described in detail.

Figure 10:
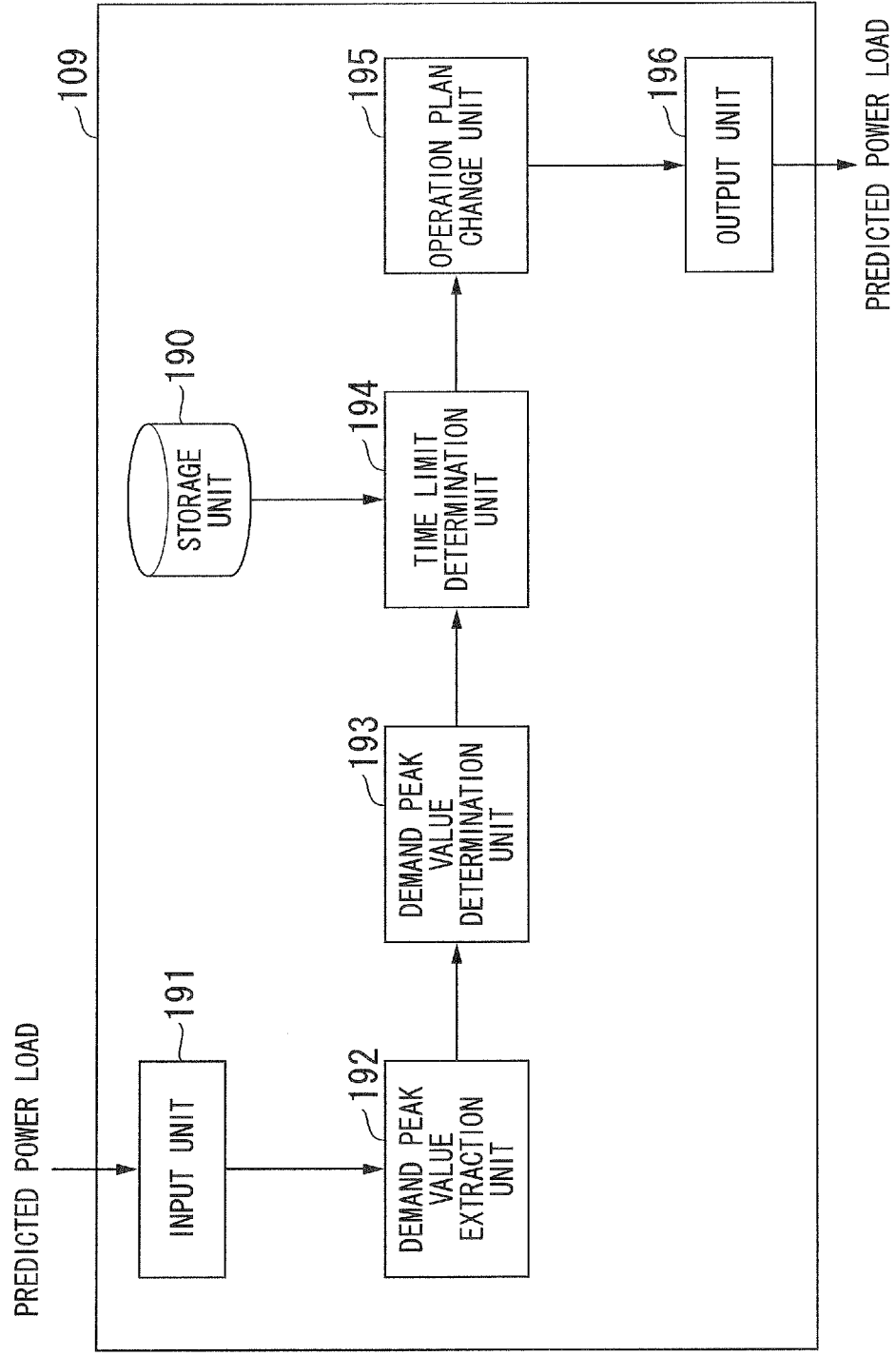
FIG. 10 is a block diagram showing an example of a configuration of a plan DR preparation unit according to a first embodiment of the present invention.

FIG. 10 is a block diagram showing an example of a configuration of the plan DR preparation unit 109.

As shown in FIG. 10, the plan DR preparation unit 109 includes a storage unit 190, an input unit 191, a demand peak value extraction unit 192, a demand peak value determination unit 193, a time limit determination unit 194, an operation plan change unit 195, and an output unit 196.

The storage unit 190 stores information indicating the contract demand, that is, the demand target value.

The input unit 191 inputs a predicted power load indicated by the operation plan data from the operation planning unit 105 or the demand excess determination unit 108.

The demand peak value extraction unit 192 extracts a demand from the predicted power loads, and extracts the maximum value (demand peak value) of an average of the corresponding demands for each demand time unit.

The demand peak value determination unit 193 compares the input demand peak value and the demand target value C. When the demand peak value is larger than the demand target value C (demand peak value>demand target value C), the demand peak value determination unit 193 outputs, to the time limit determination unit 194, information indicating the demand peak value exceeds the demand target value C.

The time limit determination unit 194 determines whether a generation period of the demand peak value exceeding the demand target value C includes the demand time unit or whether a period of time (hereinafter, referred to as consecutive target excess period Tb) exceeding the demand target value C is maintained for a limited time B ("B" hours) or more based on the information input from the demand peak value determination unit 193. The limited time B is a time during which a problem does not arise even though the outdoor air conditioner 32 stops, and a time which has been experimentally determined in advance.

The operation plan change unit 195 extracts "N" time frames from the demand time unit in descending order of the average amount of power of the power load prediction based on the information input from the time limit determination unit 194, from among average amounts of power of the power load prediction for each demand time unit included in the consecutive target excess period Tb of a time period exceeding the demand target value C. The operation plan change unit 195 changes an operation plan of the outdoor air conditioner 32 corresponding to a period Ta before the peak time earlier by "A" hours than a start time of the earliest time period among the extracted "N" time frames. For example, the operation plan change unit 195 changes the operation plan in full power operation in which a load output of the outdoor air conditioner 32 is the maximum, in the period Ta before the peak. In the consecutive target excess period Tb, the operation plan change unit 195 changes the operation plan of the outdoor air conditioner 32 in order to stop an operation of the outdoor air conditioner 32. The operation plan change unit 195 outputs, to the output unit 196, the changed operation plan as the plan DR.

The output unit 196 outputs the input plan DR to the demand excess determination unit 108.

Hereinafter, with reference to FIG. 11, an example of preparing a plan DR according to the present embodiment will be described in detail.

Figure 11:
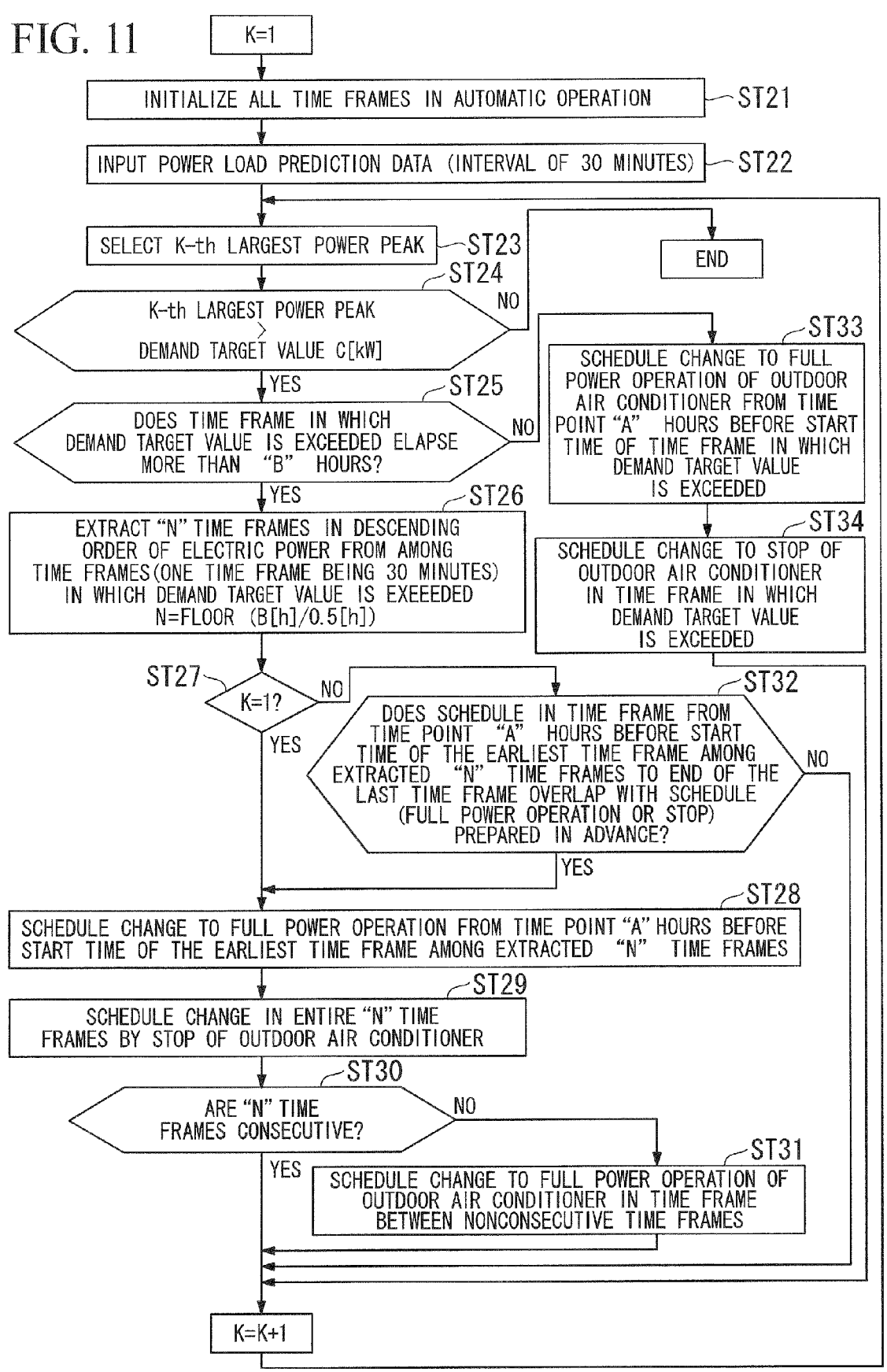
FIG. 11 is a flowchart used for describing an example of a method of preparing a plan DR according to a first embodiment of the present invention.

As shown in FIG. 11, in step ST21, the plan DR preparation unit 109 initializes all time periods to be automatically operated.

Figure 12:
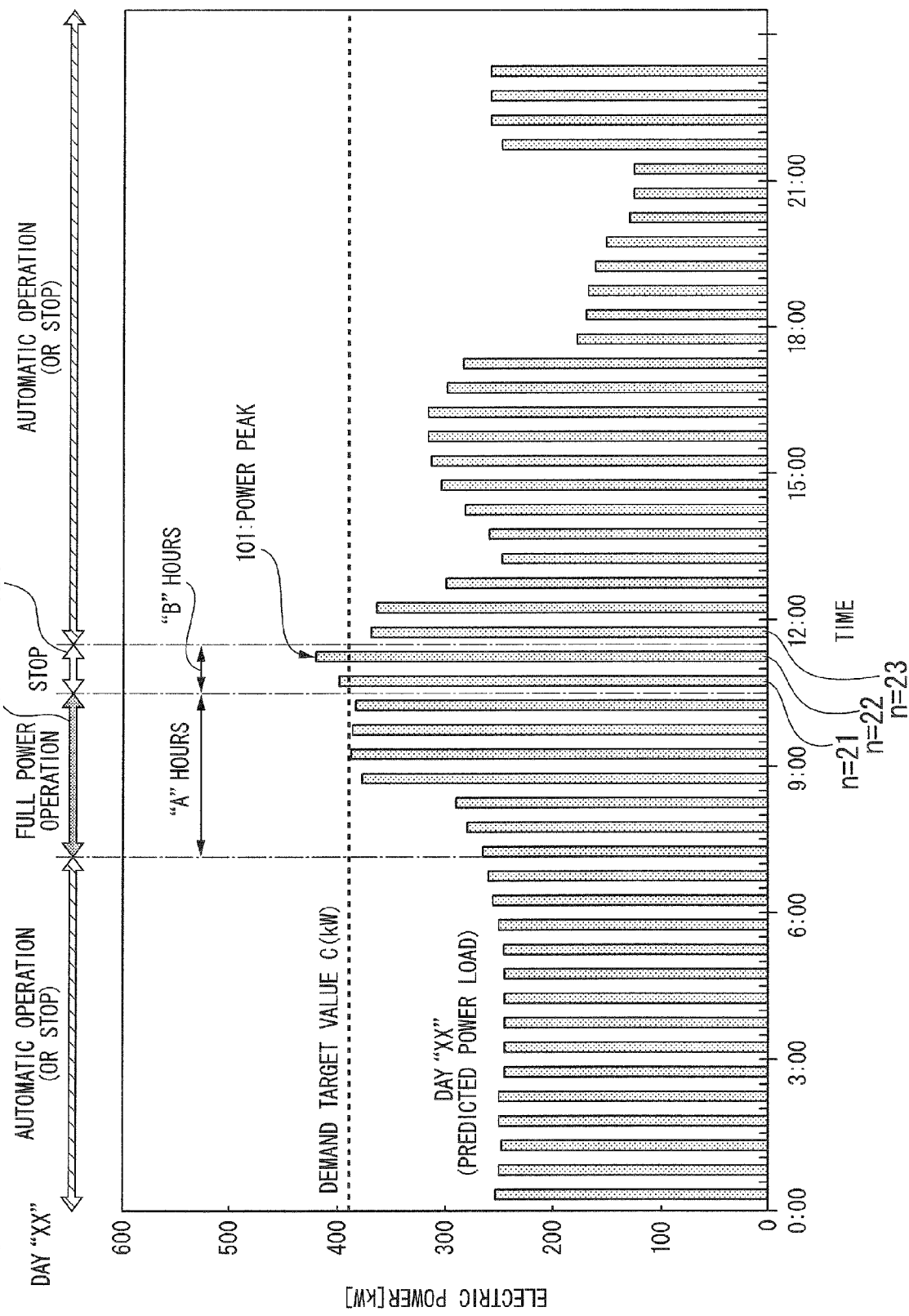
FIG. 12 is a diagram showing an example of a predicted power load according to a first embodiment of the present invention.

Next, in step ST 22, the input unit 191 of the plan DR preparation unit 109 inputs the predicted power load from the operation planning unit 105 or the demand excess determination unit 108, and outputs the input predicted power load to the demand peak value extraction unit 192. Here, an example of inputting the predicted power load P-100 or P-200 as shown in FIG. 12 to the input unit 191 will be described in detail.

Thereafter, the demand peak value extraction unit 192 extracts the demand peak value from the predicted power load. For example, the demand peak value extraction unit 192 extracts a demand peak value 101 from the predicted power load P-100. The demand peak value 101 is a predicted power load corresponding to the demand time unit (n=22) from 11:00 to 11:30 a.m. In addition, the demand peak value extraction unit 192 extracts the demand peak values 201 and 202 from the predicted power load P-200. The demand peak value 201 is a predicted power load corresponding to the demand time unit D (n=22) from 11:00 to 11:30 a.m. In addition, the demand peak value 202 is a predicted power load corresponding to the demand time unit (n=31) from 15:30 to 16:00. In addition, an average amount of power of the power load prediction of the demand peak value P201 is larger than an average amount of power of the power load prediction of the demand peak value P202.

When a plurality of the extracted demand peak values exist, the demand peak value extraction unit 192 allocates a sign K (K=1, 2, . . . ) in descending order of the corresponding predicted power load. In addition, when a number of the extracted demand peak values is one, the demand peak value extraction unit 192 allocates a sign K=1 to the demand peak value.

Next, in step ST23, the demand peak value extraction unit 192 selects the corresponding demand peak value in ascending order of the sign K to thereby output the selected peak value to the demand peak value determination unit 193.

For example, when the predicted power load P-100 is input, the demand peak value extraction unit 192 selects the demand peak value 101 of the sign K=1 to thereby output the selected demand peak value to the demand peak value determination unit 193. Meanwhile, when the predicted power load P-200 is input, the demand peak value extraction unit 192 selects the demand peak value 201 of the sign K=1 to thereby output the selected demand peak value to the demand peak value determination unit 193.

In step ST24, the demand peak value determination unit 193 compares the input demand peak value and the demand target value C. When the demand peak value is larger than the demand target value C (demand peak value>demand target value C), the demand peak value determination unit 193 outputs, to the time limit determination unit 194, information indicating the demand peak value exceeds the demand target value C.

For example, when the predicted power load P-100 is input to the demand peak value extraction unit 192, the demand peak value determination unit 193 compares the demand peak value 101 and the demand target value C. Here, since the demand peak value 101 exceeds the demand target value C, the demand peak value determination unit 193 outputs, to the time limit determination unit 194, information indicating the demand peak value 101 exceeds the demand target value C.

In addition, when the predicted power load P-200 is input to the demand peak value extraction unit 192, the demand peak value determination unit 193 compares the demand peak value 201 and the demand target value C. Here, since the demand peak value 201 exceeds the demand target value C, the demand peak value determination unit 193 outputs, to the time limit determination unit 194, information indicating the demand peak value 201 exceeds the demand target value C.

Next, in step ST25, the time limit determination unit 194 determines whether a generation period of the demand peak value exceeding the contract demand C includes the demand time unit or whether the consecutive target excess period Tb exceeding the demand target value C is maintained for the limited time B or more, based on the information input from the demand peak value determination unit 193. Here, the limited time B is one hour.

For example, when information indicating the demand peak value 101 exceeds the demand target value C is input from the demand peak value determination unit 193, the time limit determination unit 194 obtains an average amount of power of the power load prediction corresponding to the demand time unit (n=21, 20, . . . ) immediately before the demand time unit (n=22), that is, the generation period of the demand peak value 101, based on the predicted power load stored in the storage unit 190. Here, since the average amount of the power of the power load prediction corresponding to the demand time unit (n=21) is larger than the demand target value C, the time limit determination unit 194 calculates the consecutive target excess period Tb as the demand time unit ×2 (that is, 30 minutes×2=1 hour). Next, the time limit determination unit 194 obtains the average amount of the power of the power load prediction corresponding to the demand time unit (n=20) immediately before the demand time unit (n=21) determined to be included in the consecutive target excess period Tb, based on the predicted power load stored in the storage unit 190. Here, since the average amount of the power of the power load prediction corresponding to the demand time unit (n=20) is less than or equal to the demand target value C, the time limit determination unit 194 determines that the demand time unit (n=20) is not included in the consecutive target excess period Tb, and the consecutive target excess period Tb starts after the demand time unit (n=20).

In addition, when information indicating the demand peak value 101 exceeds the demand target value C is input from the demand peak value determination unit 193, the time limit determination unit 194 obtains an average amount of power of the power load prediction corresponding to the demand time unit (n=23, 24, . . . ) immediately after the demand time unit (n=22), that is, the generation period of the demand peak value 101, based on the predicted power load stored in the storage unit 190. Here, since the average amount of the power of the power load prediction corresponding to the demand time unit (n=23) is less than or equal to the demand target value C, the time limit determination unit 194 determines that the demand time unit (n=23) is not included in the consecutive target excess period Tb, and the consecutive target excess period Tb terminates before the demand time unit (n=23).

Accordingly, the time limit determination unit 194 determines that the consecutive target excess period Tb starts from the demand time unit (n=22), and terminates at the demand time unit (n=23). That is, the time limit determination unit 194 determines that the consecutive target excess period Tb is one hour, and the time limit B ("B" hours) is exceeded.

When the consecutive target excess period Tb is determined to be maintained for "B" hours or more (YES in step ST25), the time limit determination unit 194 outputs, to the operation plan change unit 195, information indicating the demand time unit included in the consecutive target excess period Tb.

In step ST26, the operation plan change unit 195 extracts "N" time frames of the demand time unit in descending order of the average amount of the power of the power load prediction from among the average amounts of the power load prediction of the demand time unit included in the consecutive target excess period Tb, that is, a time period exceeding the contract demand C based on the information input from the time limit determination unit 194.

That is, when a time frame between tα and tβ (for example, one hour and 45 minutes) is determined by the consecutive target excess period Tb and the time limit determination unit 194, the operation plan change unit 195 determines, as N, an integer obtained by dividing the consecutive target excess period Tb by the demand time unit. Here, N=floor (consecutive target excess period Tb/demand time unit) is obtained. In the above-described example, N=floor (3.5)=3 is obtained.

For example, in the predicted power load P-100, a case in which information indicating the demand time unit (n=22, 23) included in the consecutive target excess period Tb is output to the operation plan change unit 195 based on the demand peak value 101 having the sign K=1 will be described in detail.

In this case, the operation plan change unit 195 extracts the demand time unit (n=22, 23) of N=2.

Next, in step ST27, the operation plan change unit 195 determines whether the sign K=1 is satisfied. Here, since the sign K=1 is satisfied (YES in step T27), the operation plan change unit 195 changes an air conditioning heat source operation plan and a power facility operation plan of the outdoor air conditioner 32 corresponding to a period Ta1 before the peak earlier by "A" hours than a start time of the earliest time frame among the extracted "N" time frames. For example, in step ST28, the operation plan change unit 195 changes the air conditioning heat source operation plan and the power facility operation plan in a full power operation in which a load output of the outdoor air conditioner 32 is the maximum, in the period Ta1 before the peak.

In step ST29, the operation plan change unit 195 changes the air conditioning heat source operation plan and the power facility operation plan of the outdoor air conditioner 32 in order to stop an operation of the outdoor air conditioner 32.

In step ST30, the operation plan change unit 195 determines whether all of "N" demand time units corresponding to the consecutive target excess period Tb1 are consecutive in the consecutive target excess period Tb1.

When the "N" demand time units corresponding to the consecutive target excess period Tb1 are not consecutive (NO in step ST30), the operation plan change unit 195 changes the air conditioning heat source operation plan and the power facility operation plan to the full power operation in which the load output of the outdoor air conditioner 32 is the maximum, with respect to a time period between nonconsecutive time periods in step ST30.

Meanwhile, when K=1 is not satisfied (NO in step ST27), that is, when a plurality of demand peak values exist, a case in which the consecutive target excess period Tb includes the demand peak value of K≥2 will be described in detail.

For example, in the predicted power load P-200, a case in which information indicating a demand time unit (n=30, 31) included in the consecutive target excess period Tb is output to the operation plan change unit 195 based on the demand peak value 202 of a sign K=2 will be described in detail.

In step ST32, the operation plan change unit 195 determines whether a time frame from a time point "A" hours before the start time of the earliest time period of "N" time frames until the latest end time overlaps with the time period of the air conditioning heat source operation plan and the power facility operation plan having been changed.

For example, the operation plan change unit 195 determines "A" hours immediately before 15:00 to be a period Ta3 before the peak, that is, the start time of the demand time unit (n=30) of the earliest time period of the consecutive target excess period Tb. The operation plan change unit 195 determines, as a start position of an operation change period, 12:00, that is, the earliest start time of the period Ta3 before the peak. In addition, the operation plan change unit 195 determines, as a start position of an operation change period, 16:00, that is, the latest end time of the consecutive target excess period Tb.

Figure 13:
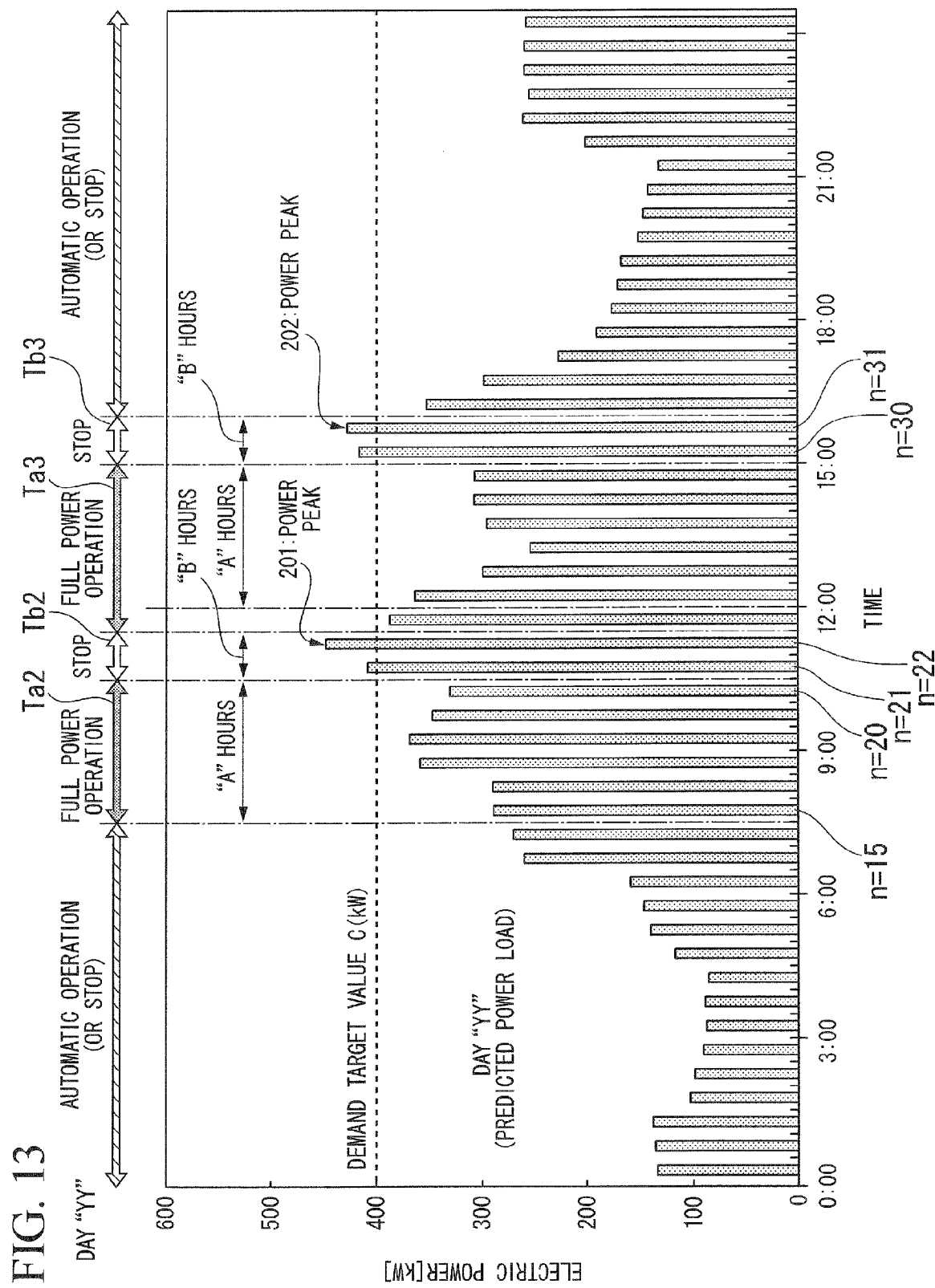
FIG. 13 is a diagram showing another example of a predicted power load according to a first embodiment of the present invention.

Here, as shown in FIG. 13, in the predicted power load P-200, a period of time from 10:30 to 11:30 during which the consecutive target excess period Tb2 is shown by the demand time unit (n=21, 22) and a period of time from 7:30 to 10:30 during which the period Ta 2 before the peak is shown by the demand time unit (n=15 to 20) are determined in advance by the operation plan change unit 195.

The operation plan change unit 195 determines whether the operation change period calculated based on the demand peak value 202 having the sign K=2 overlaps with the period Ta2 before the peak based on the demand peak value 201 having the sign K=1 in which the operation plan has already changed, or overlaps with the consecutive target excess period Tb2.

Here, the operation change period is from 12:00 to 16:00, and the operation plan change unit 195 determines that the operation change period does not overlap with any one of the period Ta2 before the peak and the consecutive target excess period Tb2 (YES in step ST32).

Next, the operation plan change unit 195 proceeds to step ST28.

Meanwhile, in step ST25, when it is determined that the consecutive target excess period Tb is not maintained for the limited time B or more (NO in step ST25), the time limit determination unit 194 outputs, to the operation plan change unit 195, information indicating the demand time unit included in the consecutive target excess period Tb.

Next, the operation plan change unit 195 changes the air conditioning heat source operation plan and the power facility operation plan of the outdoor air conditioner 32 corresponding to the period Ta before the peak earlier by "A" hours from the start time of the earliest time period of the time periods exceeding the demand target value C. For example, in step ST33, the operation plan change unit 195 changes the air conditioning heat source operation plan and the power facility operation plan to the full power operation in which the load output of the outdoor air conditioner 32 is maximized, in the period Ta before the peak.

Next, in step ST34, the operation plan change unit 195 changes the air conditioning heat source operation plan and the power facility operation plan of the outdoor air conditioner 32 in the consecutive target excess period Tb immediately after the period Ta before the peak, so that the operation of the outdoor air conditioner 32 stops.

As described above, the plan DR preparation unit 109 prepares a plan DR obtained by reducing the demand peak value, by determining a start/stop schedule for one day of the outdoor air conditioner 32 based on the predicted power load of the demand indicated by the operation plan prepared by the operation planning unit 105. Due to this, the demand exceeds the demand target value, thereby preventing the demand maximum value from exceeding the contract demand C. Thus, a problem does not occur such that an additional charge such as a penalty is imposed on a paid charge determined to correspond to the contract demand C in advance when the average maximum power used during the demand time unit exceeds the contract demand C. As a result, economical effects may be obtained.

In addition, as described above, a major purpose of the outdoor air conditioner 32 is to perform room ventilation, and there is no big problem even when the outdoor air conditioner 32 stops for a while after performing sufficient ventilation. Thus, when the demand peak value is predicted to exceed a predetermined threshold value (demand target value) in the operation plan, the plan DR preparation unit 109 according to the present embodiment suppresses the demand peak value by carrying out the following processing. That is, the plan DR preparation unit 109 prepares a plan DR such as stopping the outdoor air conditioner 32 at the time period of the demand peak value, by carrying out a full power operation on the outdoor air conditioner 32 before the time period having the demand peak value.

In addition, as described above, in a case in which the demand peak value exceeds the demand target value C two times, when the power peak of the second time appears at a time point "A" hours after the stoppage of the outdoor air conditioner of the first time, the outdoor air conditioner stops one more time. During this time, a full power operation is carried out on the outdoor air conditioner from a time point "A" hours before the outdoor air conditioner 32 stops. Consequently, when the air conditioning heat source operation plan and the power facility operation plan are changed to fully open or stop the operation of the outdoor air conditioner 32, the plan DR preparation unit 109 prepares the plan DR so that the changed period does not overlap with the period changed this time.

In addition, the plan DR preparation unit 109 does not carry out a full power operation on the outdoor air conditioner 32, and it is possible to control an output so that a concentration of $CO_2$ becomes in a normal state within "A" hours, and the demand peak value is reduced. Specifically, the plan DR preparation unit 109 controls the output of the outdoor air conditioner 32 based on a measured result obtained by measuring the power demand of the air conditioning heat source facility devices 3 and the operation facility devices 4 and the concentration of $CO_2$ in real-time, thereby optimally controlling the output of the outdoor air conditioner 32.

Example of Air Conditioning Heat Source Facility Device

Hereinafter, an example of the air conditioning heat source facility devices 3 will be described in detail.

Figure 14:
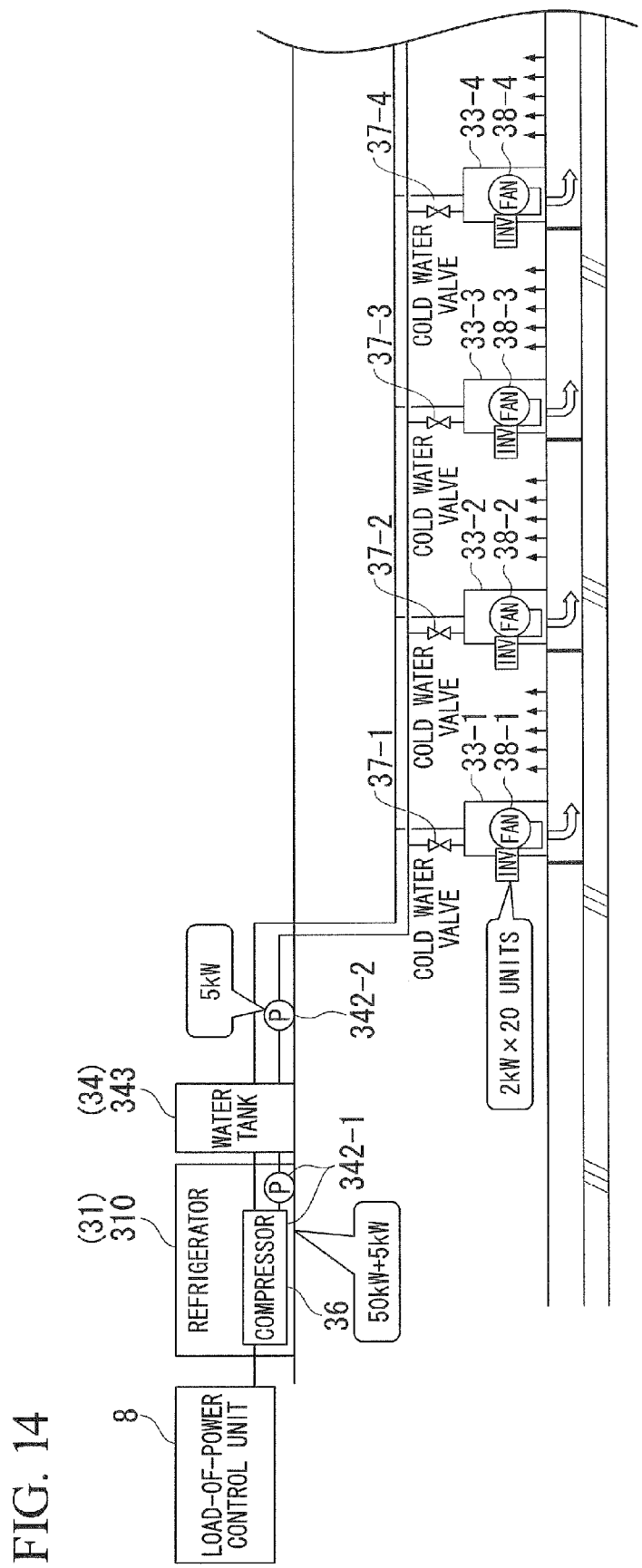
FIG. 14 is a diagram showing an example of a service, that is, a control target of a power demand according to a first embodiment of the present invention.

FIG. 14 is a diagram showing the example of the air conditioning heat source facility devices 3. The load-of-power control unit 8 controls power demand of a plurality of air conditioning heat source facility devices 3 included in air conditioning services of cooling the room by, for example, night power.

In FIG. 14, a refrigerator 310, that is, the heat source 31 among the plurality of air conditioning heat source facility devices 3, the water tank 343 of the pump and fan 34, the air conditioners 33-1 to 33-4, and a pump 343 (including primary pump 342-1 and secondary pump 342-2) will be described as examples. In a service of a control target, there are a plurality of control target devices operating the plurality of power devices. The refrigerator 310 includes, for example, a compressor 36 and the primary pump 342-1. The compressor is supplied with power of 50 kW of and the primary pump 342-1 is supplied with power of 5 kW. The secondary pump 342-2 supplies water stored in the water tank 343 to the plurality of air conditioners 33-1 to 33-4. The secondary pump 343-2 is supplied with power of 5 kW. A plurality of cool water valves 37 (cool water valves 37-1, 37-2, 37-3, 37-4, . . . ) supplies, to each of the air conditioners 33-1 to 33-4, the cool water supplied from the secondary pump 343-2. Since each of the air conditioners 33-1 to 33-4 includes a fan (fans 38-1, 38-2, 38-3, 38-4, . . . ), the fans are supplied with power of 2 kW. Here, the air conditioners 33-1 to 33-4 send cold air by the cool water into a double floor, and then a floor-blowing air conditioning for blowing out air is performed.

Real-Time DR Processing by Real-Time DR Execution Instruction Unit 110

Hereinafter, an example of the real-time DR processing by the real-time DR execution instruction unit 110 will be described in detail.

Figure 15:
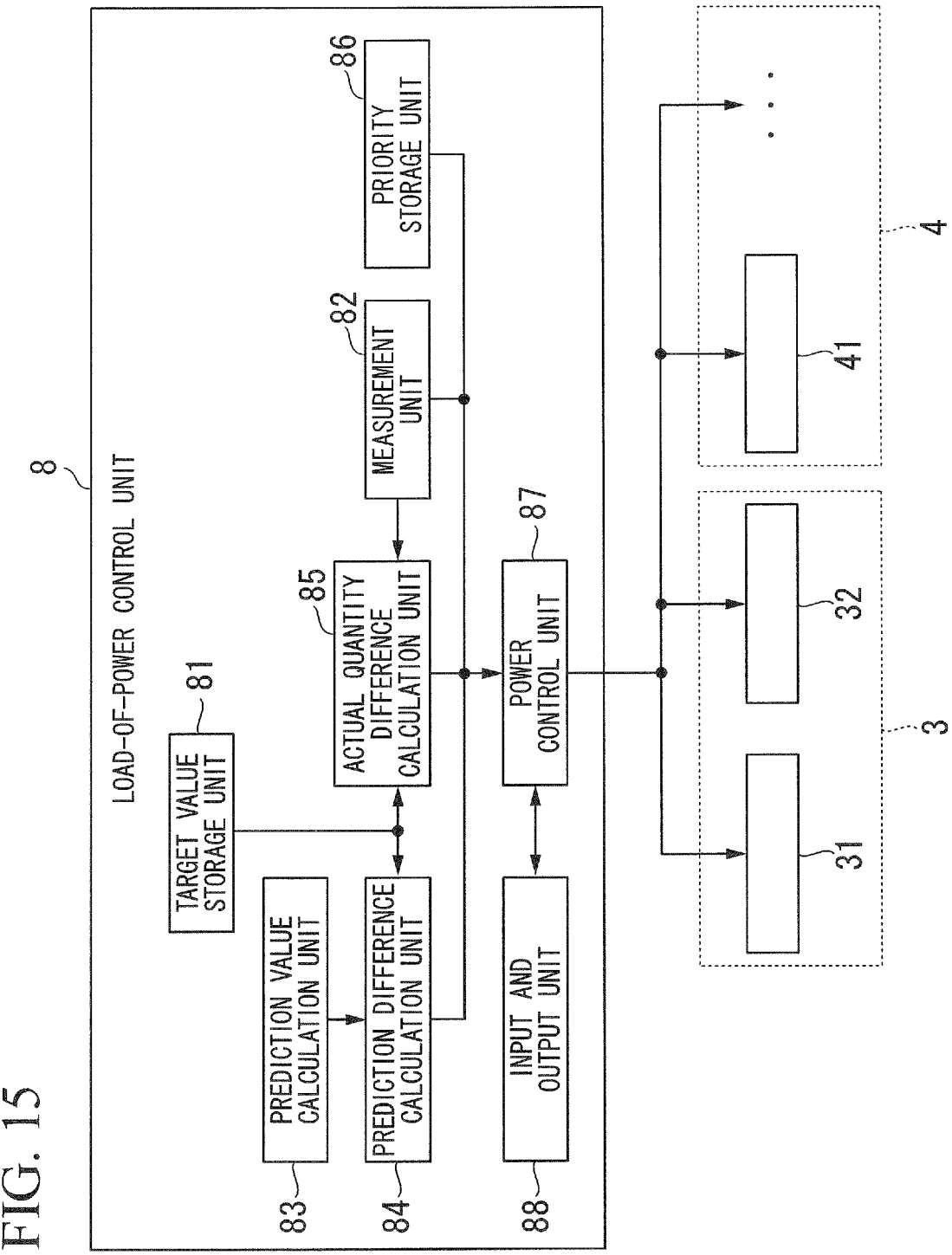
FIG. 15 is a block diagram showing an example of a configuration of a load power control apparatus according to a first embodiment of the present invention.

FIG. 15 is a block diagram showing an example of a configuration of the load-of-power control unit 8 according to the present embodiment.

As shown in FIG. 15, the load-of-power control unit 8 includes a target value storage unit 81, a measurement unit 82, a prediction value calculation unit 83, a prediction difference calculation unit 84, an actual quantity difference calculation unit 85, a priority storage unit 86, a power control unit 87, and an input/output unit 88.

In the target value storage unit 81, a target value of power demand (maximum power demand) having the maximum is determined in advance based on actual values of power demand measured for each of a plurality of predetermined measurement periods (demand time units), and the determined target value is stored. That is, the demand target value C is stored.

Figure 16:
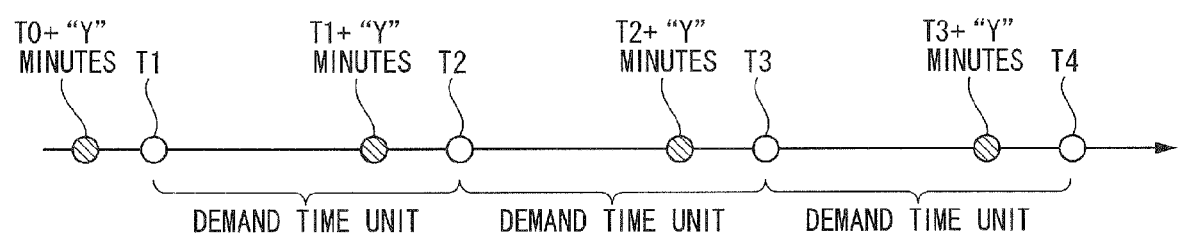
FIG. 16 is a diagram showing an example of a timing of a real-time DR processing according to a first embodiment of the present invention.

The measurement unit 82 measures an actual value of the power demand during the demand time unit of a measurement target period. Here, the measurement unit 82 measures power used by a device (cooler, pump, fan, and the like) using power in a floor of the control target, and calculates an estimation value of average power demand when the demand time unit ends. For example, as shown in FIG. 16, points in time of T1, T2, T3, T4, . . . are respectively used as a divided point of time of the demand time unit. Here, when the demand time unit is "X" minutes (for example 30 minutes), T2 is T1+X minutes, T3 is T2+X minutes, and T4 is T3+X minutes.

The measurement unit 82 calculates the estimation value of the average power demand by measuring the actual value of the power demand for each predetermined time (for example, 3 minutes) within the demand time unit.

In addition, the measurement unit 82 stores, in the priority storage unit 86 which will be described later, operation data, that is, an actual value of the measured power usage.

The prediction value calculation unit 83 calculates a prediction value of the power demand for a measurement target period, before when a measurement of the actual value starts in the measurement target period, that is, the measurement target of the actual value from a plurality of consecutive measurement periods. For example, as shown in FIG. 17, the prediction value calculation unit 83 calculates the prediction value of the average power demand during the demand time unit between T1 and T2, at a point of time (T0+Y minute) earlier than a predetermined time (for example, T1−T0−Y minute) at a point of time of T1 when the measurement during the demand time unit between T1 and T2 starts. Here, as a method of calculating the prediction value, a method of using a neural network model disclosed in JP-A-2006-78009 may be adopted. For example, the prediction value is calculated by modeling the power demand based on an outside temperature, humidity, a wind speed, an air volume, an air conditioning operation time, day of week, season, and the like. A calculation processing of a prediction difference by the prediction value calculation unit 83 is performed before a predetermined time (for example, 3 to 5 minutes) of each of the consecutive demand time units. Due to this, when the demand time unit is 30 minutes, the calculation processing of the prediction value by the prediction value calculation unit 13 is performed 48 times in one day.

The prediction difference calculation unit 84 compares the prediction value calculated by the prediction value calculation unit 83 with the target value stored in the target value storage unit 11, and calculates a difference between the prediction value and the target value when the prediction value exceeds the target value. The difference calculated by the prediction difference calculation unit 84 is a DR requirement amount indicating the amount of the power demand required to be reduced by the power control processing (DR demand response processing).

The actual quantity difference calculation unit 85 compares an estimation value of the average power demand based on the actual value measured by the measurement unit 82 with the target value stored in the target value storage unit 81, and calculates the difference between the estimation value and the target value when the estimation value exceeds the target value. The difference calculated by the actual difference calculation unit 85 is a DR requirement amount indicating the amount of the power demand required to be reduced by the DR processing. The actual quantity difference calculation unit 85 carries out the calculation processing of the actual quantity difference for each predetermined time (for example, 3 minutes) within the demand time unit.

In the priority storage unit 86, a priority table is stored in advance in which priorities are assigned to supply reduction target devices, the priorities being determined in advance according to the DR requirement amount calculated by the prediction difference calculation unit 84 or the actual quantity difference calculation unit 85, and supply reduction target devices being load devices selected from load devices to which reduced power is supplied.

FIG. 17 is a diagram showing a data example of the priority table stored in the priority storage unit 86. Actual operation data is information in which an actual value of the power demand of the operated load device is measured and stored by the measurement unit 82. For example, the compressor 36 and the primary pump 342-1 uses 55 kW (50 kW+5 kW=). The secondary pump 342-2 uses power of 5 kW. The plurality of fans 38-1, 38-2, . . . installed in the air conditioners 30-1, 30-2, . . . use 40 kW (2 kW×20 units).

In addition, an example in which the air conditioner 30 has 20 units will be herein described.

The total power is a sum of power usage of the supply reduction target device. A single DR effect is the amount of the power demand reduced by a control in the corresponding priority. A DR cumulative effect is a cumulative amount of the power demand reduced by a control from a first priority ranking to a corresponding priority ranking.

The first to fifth priority rankings indicate a great difference between the target value with the prediction value of the actual value as the number is increased, and a reduced amount of power demand with respect to the corresponding supply reduction target device is increased. Here, a symbol "▼" is assigned to an item in which there is a change in the supply power for each of the priority rankings. For example, in the first priority ranking, the power demand of the compressor and the primary pump 342-1 is reduced from 100% to 70%. Due to this, the power demand of (55 (kW)×30(%)=) 16.5 kW is reduced. In the second priority ranking, the power demand of the compressor and the primary pump 342-1 is blocked to be reduced from 70% to 0%. Due to this, the power demand of (55 (kW)×70(%)=) 38.5 kW is reduced. Thus, while the cold remains in a water tank 343 even though a capacity of the compressor 36 is reduced, the indoor thermal environment is not affected.

In the third priority ranking, one half of a plurality of cold water valves is closed. Thus, since load power of the secondary pump 343-2 becomes a half, the power demand of 2.5 kW (=5 kW/2) is reduced. Since a slab is cooled by the floor-blowing air conditioning even though the cold water valve is closed, degradation in the indoor environment is minimized when air is blown using a fan. Here, in order to enable a plurality of air conditioners arranged in a zigzag form to be operated in rotation, the opening and closing of the cold water valves is carried out. First, in the fourth priority ranking, all cold water valves are closed. Since the load power of the secondary pump 343-2 becomes zero by doing this, the power demand of 22.5 kW is reduced. In the fifth priority ranking, the power demand of 20.0 kW is reduced when all fans stop.

In this manner, the corresponding priority rankings reducing the power demand are set in advance for each of the load devices, that is, a supply target of electric power, and thereby the power demand is reduced to have no effect on the indoor environment of services. For example, when reducing the power supply to an air conditioning hardly influencing other load devices as a target device of the DR processing, the power demand in air conditioning services in which the compressor, the pump, or the air conditioner are cooperatively operated in the cooling apparatus is systematically reduced to prevent degradation of a cooling capability with respect to the room as much as possible.

When information indicating a execution instruction of the real-time DR is input from the building energy management system 1 through the input and output unit 88, the power control unit 87 carries out the real-time DR processing in the following manner.

The power control unit 87 reads the supply reduction target device stored in the priority storage unit 86 in accordance with the priority corresponding to the DR requirement amount calculated by the prediction difference calculation unit 84 or by the actual quantity difference calculation unit 15, and outputs an alarm reducing the power demand during the demand time unit. Here, for example, the load-of-power control unit 8 includes a buzzer outputting the alarm or a display (display unit) displaying information, so that information about the supply reduction target device is displayed in the display while the buzzer outputs the alarm. A control signal of reducing or stopping the power demand may be sent to the load device of the supply reduction target device corresponding to the DR requirement amount.

In this manner, like a conventional demand control processing, the power control unit 87 determines to exceed the target value only during the demand time unit not to execute the DR processing during the remaining time, but to execute both the DR processing of a prediction mode by the prediction value calculated before the demand time unit and the DR processing of an actual quantity mode by the estimation value calculated during the demand time unit. That is, the demand time unit starts and at the same time the DR processing starts by the DR processing of the prediction mode, and a correction is carried out by the DR processing of the actual quantity mode when the prediction value and the actual value shift.

Figure 18:
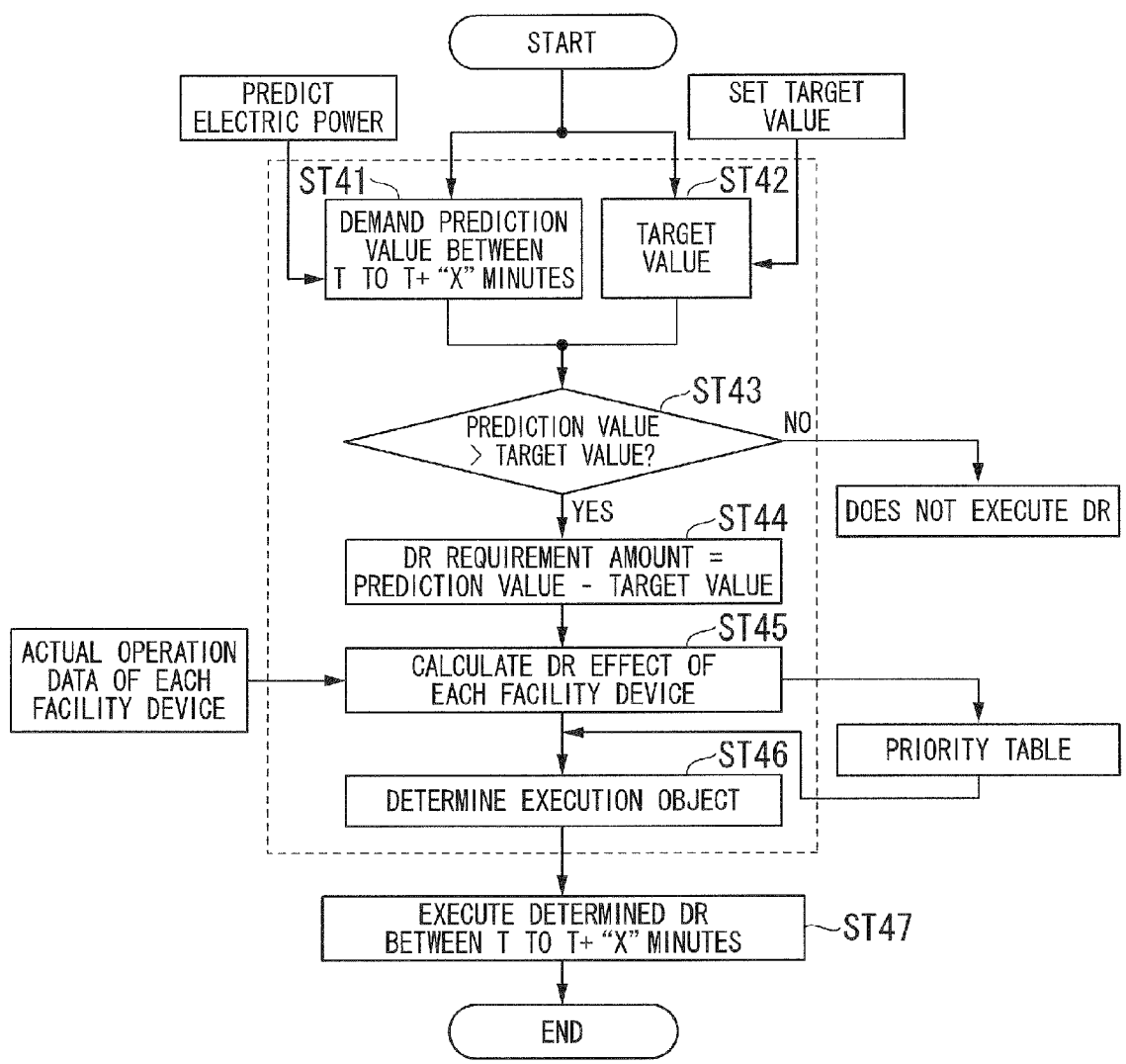
FIG. 18 is a flowchart showing an example of a real-time DR processing of a prediction mode according to a first embodiment of the present invention.

Hereinafter, an operation example of the load-of-power control unit 8 will be described with reference to a corresponding drawing. FIG. 18 is a flowchart showing an operation example of the real-time DR processing by the load power apparatus 8.

In step ST41, the prediction value calculation unit 83 calculates the prediction value of the average power demand between T2 and T3(T2+X) minutes, at a point of time (for example, T2−Y minutes) earlier than a point of time (for example, T2) when the demand time unit (for example, between T2 and T3 in FIG. 16) starts. In step ST42, the prediction difference calculation unit 84 reads the demand target value of the maximum power demand stored in the target value storage unit 81. In step ST43, the prediction difference calculation unit 84 determines whether the prediction value exceeds the target value. When the prediction value is determined not to exceed the target value by the prediction difference calculation unit 84 (NO in step ST43), the power control unit 87 does not execute the real-time DR processing.

In step S43, when the prediction value is determined to exceed the target value by the prediction difference calculation unit 84 (YES in step ST43), a difference between the prediction value and the target value is calculated as the DR requirement amount in step ST44. In step ST45, the measurement unit 82 acquires actual operation data of each of the load devices at that point of time, and stores the acquired data in the priority storage unit 86. In step ST46, the power control unit 87 reads, from the priority table stored in the priority storage unit 86, the supply reduction target device in accordance with the priority corresponding to the DR requirement amount. In step ST47, the power control unit 87 carries out the real-time DR processing with respect to the supply reduction target device determined in step ST46 between T2 to T3(T2+X minutes).

Figure 19:
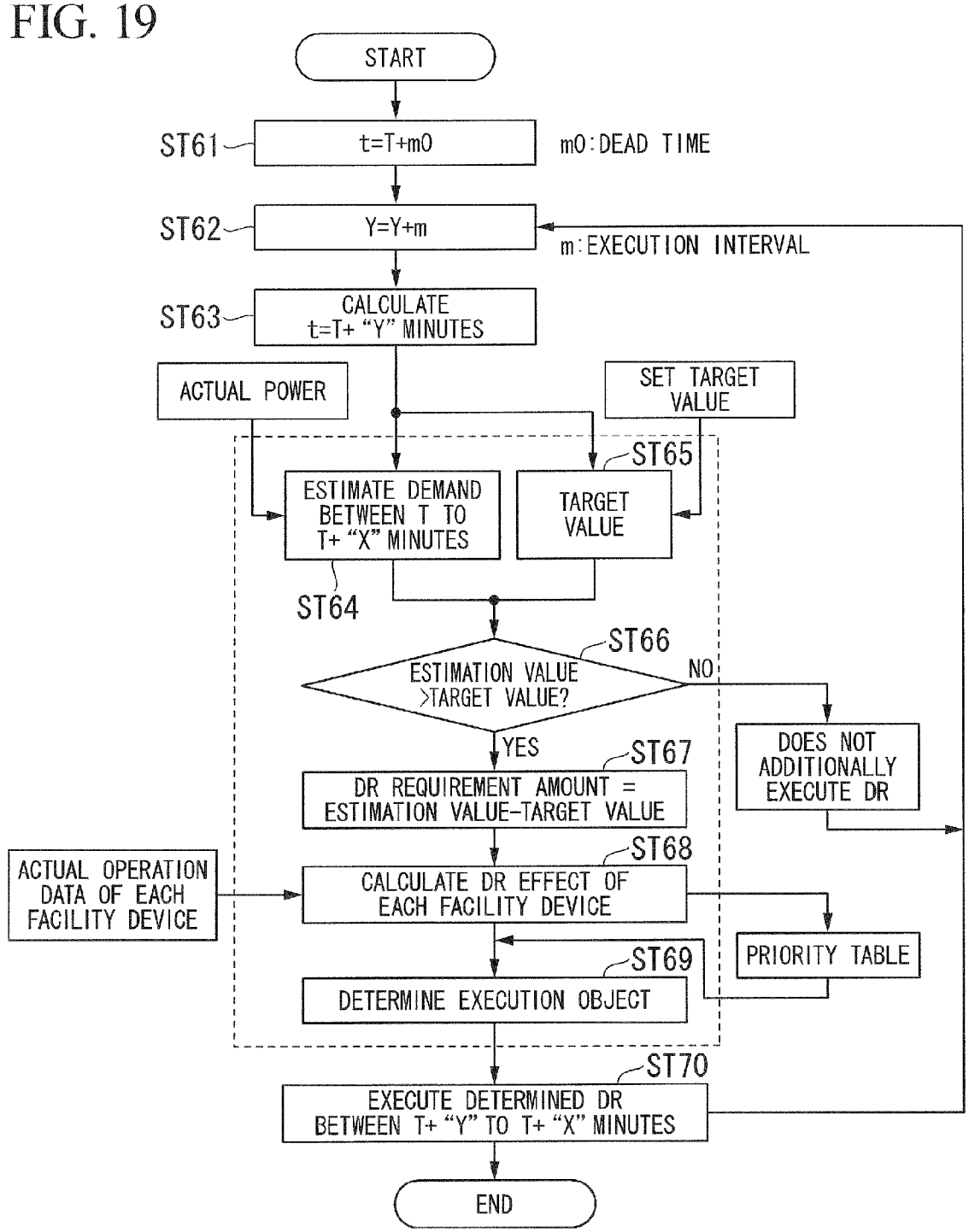
FIG. 19 is a flowchart showing an example of a real-time DR processing of a actual quantity mode according to a first embodiment of the present invention.

FIG. 19 is a flowchart showing an operation example of the real-time DR processing of an actual quantity mode by the load-of-power control unit 8.

In step ST61, the load-of-power control unit 8 carries out the real-time DR processing based on the actual value after a demand start time, but does not execute the real-time DR processing during a dead time ("m0" minutes) of a predetermined time until acquiring the actual value of the power. The actual quantity difference calculation unit 85 calculates the actual quantity difference at an interval of "m" minutes in step ST62, and carries out the real-time DR processing of the actual quantity mode when a time obtained from its own timing function is T+Y(Y=Y+m) minutes in step ST63. In step ST64, the measurement unit 82 calculates the estimation value of the average power demand based on the actual value of the power demand of the load device. In step ST65, the actual quantity difference calculation unit 85 reads the target value of the maximum power demand stored in the target value storage unit 81. In step ST66, when the estimation value is determined not to exceed the target value by the actual quantity difference calculation unit 85 (NO in step ST66), the power control unit 87 does not execute the real-time DR processing.

In step ST66, when the estimation value is determined to exceed the target value by the actual quantity difference calculation unit 85 (YES in step ST66), the power control unit 87 calculates the difference between the estimation value and the target value as the DR requirement amount in step ST67. In step ST68, the measurement unit 82 acquires the actual operation data of each of the load devices at that point of time, and stores the acquired data in the priority storage unit 86 in step ST68. In step ST69, the power control unit 87 reads, from the priority table stored in the priority storage unit 86, the supply reduction target device in accordance with the priority corresponding to the DR requirement amount. In step ST70, the power control unit 87 carries out the DR processing with respect to the supply reduction target device determined in step ST69 between T+Y to T+X minutes.

As described above, according to an embodiment, it is possible to execute the real-time DR processing based on the prediction value of the average power demand calculated by a neural network model before the actual value of the power demand during the demand time unit is measured. That is, since the DR processing time is increased in comparison with calculating the estimation value of the average power demand and carrying out the DR processing after measuring the actual value of the power demand within the demand time unit in the related art, a reduction effect of the power demand is increased. For example, the DR processing can be performed only after a predetermined time (T1+m0) during which the actual value of the power demand is acquired starting from a start point of time (T1) of the demand time unit in the related art, however, according to the present embodiment, the DR processing is accurately performed starting from the start time (T1) of the demand time unit.

In addition, according to the present embodiment, the prediction value calculation unit 83 carries out a calculation processing of the prediction value by the neural network model, however, may calculate the prediction value for 24 hours for each of the demand time unit ("X" minutes) once a day to store the calculated prediction value.

In the present embodiment, the load-of-power control unit 8 includes the measurement unit 82, however, the measurement unit 82 may be equipped with an external computer device of the load-of-power control unit 8. Also, when an existing control system controlling the power demand is provided in, for example, services of a control target of the power demand, the power control unit 87 of the load-of-power control unit 8 may send information about the supply reduction target device to the existing control system, thereby reducing the power demanded by the control system.

Second Embodiment

Figure 20:
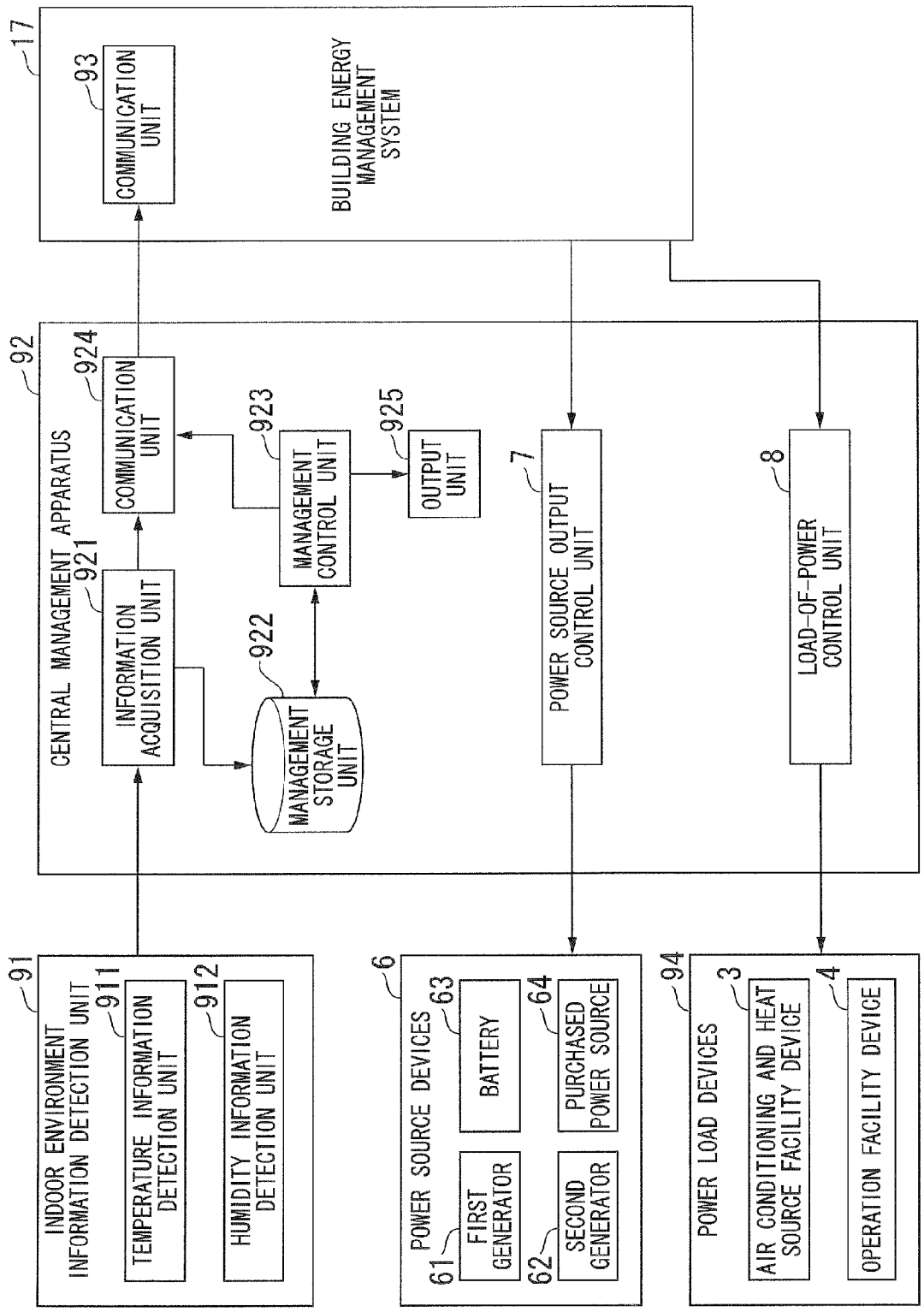
FIG. 20 is a block diagram showing an example of a configuration of a smart grid system according to a second embodiment of the present invention.

The present invention is not limited to the above-described configuration, and a configuration shown in FIG. 20 may be used. FIG. 20 is a block diagram showing an example of a smart grid system according to the second embodiment. The same reference numerals are applied to a configuration having a function similar to that of the configuration shown in FIG. 1, and thus the detailed description thereof will be omitted.

As shown in FIG. 20, the building energy management system 17 further includes a communication unit 93 in comparison with the above-described building energy management system 1. The communication unit 93 is connected to a central management apparatus 92 through a network. Power load devices 94 include the air conditioning heat source facility device 3 and the operation facility device 4.

The central management apparatus 92 includes an information acquisition unit 921, a management storage unit 922, a management control unit 923, a communication unit 924, an output unit 925, the power source output control unit 7, and the load-of-power control unit 8.

The information acquisition unit 92 inputs an actual value detected by an indoor environment information detection unit 91, and stores the input actual value in the management storage unit 922 in association with a time when the actual value is measured.

The management control unit 923 is a computer managing the central management apparatus 92 in an integrated manner. The management control unit 923 sends, to the building energy management system 17 through the communication unit 924, the actual value acquired by the information acquisition unit 921 from the indoor environment information detection unit 91. In addition, the management control unit 923 outputs the actual value stored in the management storage unit 922 to the output unit 925.

The output unit 925 is a display device or a printer, and displays or prints information input from the management control unit 923.

The indoor environment information detection unit 91 includes a detection unit such as a temperature information detection unit 911 or a humidity information detection unit 912, and outputs the detected actual value to the central management apparatus.

Due to this configuration, in services of a building having a solar power generation services and the like, the building energy management system 17 manages the power supply even when power is supplied to the load device by combining the generated power and the purchased power, thereby realizing a stable power supply to the services.

In addition, even when the thermal load is changed in accordance with a location of each building, an application usage of the services, or the like, it is possible to reduce the peak value of the purchased power in a building unit.

In addition, according to the present embodiment, a program for implementing operations of a processing unit may be recorded in a computer readable recording medium, and a computer system may read and execute the program recorded in the recording, whereby a control of the operation management and a control of the power demand may be executed. In addition, the computer system includes hardware such as OS, a peripheral device, or the like. In addition, the computer system also includes a WWW system having an environment (display environment) providing a home page.

In addition, the computer readable recording medium includes portable media such as flexible disks, magneto-optical discs, ROM, CD-ROM, and the like, and a storage device such as hard disks embodied in the computer system.

Furthermore, the computer readable recording medium may maintain the program for a certain time, such as in an internal volatile memory RAM of the computer system being a server or a client when the program is transmitted through a communication line such as a telephone line or a network such as the Internet.

In addition, the program may be transmitted from the computer system storing the program in the storage device to other computer systems through a transmission medium or by a transmission wave of the transmission medium. Here, the transmission medium transmitting the program may be a medium having a function of transmitting information such as the communication line of the telephone line or the network of the Internet. In addition, the program may implement a part of the above-described function. Also, the program may be so-called a differential file (differential program) implemented by combining with the program that already recorded the above-described function in the computer system.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. An operation management apparatus, comprising:
an air conditioning thermal load prediction unit configured to calculate an air conditioning thermal load predicted value indicating a predicted amount of heat required to adjust temperature to a pre-set temperature for a day-of-prediction;
a power generation output prediction processing unit configured to calculate power generation output prediction data indicating a generated power obtained by a generator within the day-of-prediction;
an operation planning unit configured to prepare an air conditioning heat source operation plan indicating allocation for every hour of operation of each of the air conditioning heat source apparatuses generating the amount of heat indicated by the air conditioning thermal load predicted value, calculates a predicted power load indicating the power supplied to a load device to generate the predicted amount of heat indicated by the air conditioning thermal load predicted value based on the air conditioning thermal load predicted value, and determines a purchased power corresponding to a power of the predicted power load and the generated power using the power generation output prediction data to thereby prepare a power facility operation plan indicating a schedule of a power output from the purchased power source and the generator, so that the purchased power per predetermined time supplied from a purchased power source of a commercial power system becomes a target value;
a demand excess determination unit configured to determine whether the purchased power supplied from the purchased power source per the predetermined time exceeds the target value; and
a plan change unit configured to change the air conditioning heat source operation plan and the power facility operation plan to reduce the purchased power per the predetermined time exceeding the target value when the purchased power is determined to exceed the target value by the demand excess determination unit, and to increase the purchased power per the predetermined time when the purchased power is determined not to exceed the target value,
wherein the plan change unit is further configured to change the air conditioning heat source operation plan when the purchased power is determined to exceed the target value in such a manner that an operation time period of a predetermined air conditioning heat source apparatus among the air conditioning heat source apparatuses is shifted to a time period in which the predicted power load is low.

2. The operation management apparatus according to claim 1, further comprising:
a real-time power demand control unit configured to control so as to reduce the purchased power per the predetermined time when a predicted value of the purchased power predicted to be supplied from the purchased power source per the predetermined time exceeds the target value based on actual measurement data obtained by measuring the purchased power supplied to the load device from the purchased power source, in a case where the demand excess determination unit determines whether the purchased power per the predetermined time supplied from the purchased power source exceeds the target value based on the predicted power load in which the purchased power is changed by the plan change unit, and the purchased power is determined to exceed the target value.

3. The operation management apparatus according to claim 1, wherein
a priority ranking is set to each of the air conditioning heat source apparatuses in advance, and
the plan change unit is further configured to change the air conditioning heat source operation plan when the purchased power is determined to exceed the target value in such a manner that operation powers of the air conditioning heat source apparatuses are sequentially reduced in accordance with the priority rankings.

4. An operation management method, comprising:
calculating an air conditioning thermal load predicted value indicating a predicted amount of heat required to adjust a temperature to a pre-set temperature on a day-of-prediction;
calculating power generation output prediction data indicating a generated power obtained by a generator within the day-of-prediction;
preparing an air conditioning heat source operation plan indicating allocation for every hour of operation of each of the air conditioning heat source apparatuses generating the amount of heat indicated by the air conditioning thermal load predicted value;
calculating a predicted power load indicating the power supplied to a load device to generate the predicted amount of heat indicated by the air conditioning thermal load predicted value based on the air conditioning thermal load predicted value, and determining a purchased power corresponding to a power of the predicted power load and the generated power using the power generation output prediction data to thereby prepare a power facility operation plan indicating a schedule of a power output from the purchased power source and the generator, so that the purchased power per predetermined time supplied from a purchased power source of a commercial power system becomes a target value;
determining whether the purchased power supplied from the purchased power source per the predetermined time exceeds the target value; and
changing the air conditioning heat source operation plan and the power facility operation plan to reduce the purchased power per the predetermined time exceeding the target value when the purchased power is determined to exceed the target value by the demand excess determination unit, and increasing the purchased power per the predetermined time when the purchased power is determined not to exceed the target value,
wherein the air conditioning heat source operation plan is changed when the purchased power is determined to exceed the target value in such a manner that an operation time period of a predetermined air conditioning heat source apparatus among the air conditioning heat source apparatuses is shifted to a time period in which the predicted power is low.

5. The operation management method according to claim 4, further comprising:
setting a priority ranking to each of the air conditioning heat source apparatuses; and
changing the air conditioning heat source operation plan when the purchased power is determined to exceed the target value in such a manner that operation powers of the air conditioning heat source apparatuses are sequentially reduced in accordance with the priority rankings.

6. A non-transitory computer-readable storage medium comprising an operation management program causing a computer to function as:
a unit that calculates an air conditioning thermal load predicted value indicating a predicted amount of heat required to adjust temperature to a pre-set temperature on a day-of-prediction,
a unit that calculates power generation output prediction data indicating the generated power obtained by a generator within the day-of-prediction;
a unit that prepares an air conditioning heat source operation plan indicating allocation for every hour of operation of each of the air conditioning heat source apparatuses generating the amount of heat indicated by the air conditioning thermal load predicted value, calculates a predicted power load indicating the power supplied to a load device to generate the predicted amount of heat indicated by the air conditioning thermal load predicted value based on the air conditioning thermal load predicted value, and determines a purchased power corresponding to a power of the predicted power load and the generated power using the power generation output prediction data to thereby prepare a power facility operation plan indicating a schedule of a power output from the purchased power source and the generator, so that the purchased power per predetermined time supplied from a purchased power source of a commercial power system becomes a target value;
a unit that determines whether the purchased power supplied from the purchased power source per the predetermined time exceeds the target value; and
a unit that changes the air conditioning heat source operation plan and the power facility operation plan to reduce the purchased power per the predetermined time exceeding the target value when the purchased power is determined to exceed the target value by the demand excess determination unit, and increases the purchased power per the predetermined time when the purchased power is determined not to exceed the target value,
wherein the operation management program further causes a computer to function as a unit that changes the air conditioning heat source operation plan when the purchased power is determined to exceed the target value in such a manner that an operation time period of a predetermined air conditioning heat source apparatus among the air conditioning heat source apparatuses is shifted to a time period in which the predicted power load is low.

7. The non-transitory computer-readable storage medium according to claim 6, wherein the operation management program further causes a computer to function as:
a unit that sets a priority ranking to each of the air conditioning heat source apparatuses; and
a unit that changes the air conditioning heat source operation plan when the purchased power is determined to exceed the target value in such a manner that operation powers of the air conditioning heat source apparatuses are sequentially reduced in accordance with the priority rankings.

* * * * *